(12) United States Patent
Morota et al.

(10) Patent No.: US 8,845,371 B2
(45) Date of Patent: Sep. 30, 2014

(54) WATER JET PROPULSION WATERCRAFT

(75) Inventors: Koichiro Morota, Shizuoka (JP); Shigeyuki Ozawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 240 days.

(21) Appl. No.: 13/459,277

(22) Filed: Apr. 30, 2012

(65) Prior Publication Data
US 2012/0214365 A1    Aug. 23, 2012

Related U.S. Application Data

(63) Continuation-in-part of application No. 12/644,874, filed on Dec. 22, 2009, now Pat. No. 8,287,324.

(30) Foreign Application Priority Data

Apr. 8, 2009  (JP) ................................. 2009-093914
Jul. 6, 2011  (JP) ................................. 2011-149723

(51) Int. Cl.
| | |
|---|---|
| *B63H 21/32* | (2006.01) |
| *F01N 13/00* | (2010.01) |
| *F01N 3/04* | (2006.01) |
| *F01N 13/14* | (2010.01) |
| *F01N 13/18* | (2010.01) |
| *F01N 13/12* | (2010.01) |

(52) U.S. Cl.
CPC ............... *B63H 21/32* (2013.01); *F01N 3/043* (2013.01); *F01N 13/141* (2013.01); *F01N 13/1805* (2013.01); *Y02T 10/20* (2013.01); *F01N 13/12* (2013.01)
USPC ...................................... 440/89 B; 440/89 H

(58) Field of Classification Search
USPC .... 440/89 H, 89 HE, 89 R, 89 B, 89 C, 89 E, 440/89 F, 89 J
See application file for complete search history.

(56) References Cited

U.S. PATENT DOCUMENTS

| | | | | |
|---|---|---|---|---|
| 3,942,599 | A * | 3/1976 | Shimada | 180/292 |
| 5,830,022 | A * | 11/1998 | Nakase et al. | 440/88 R |
| 6,106,344 | A | 8/2000 | Mashiko | |
| 6,113,446 | A * | 9/2000 | Mineo | 440/89 J |
| 6,244,915 | B1 * | 6/2001 | Ozawa | 440/88 R |

FOREIGN PATENT DOCUMENTS

JP    11-011393 A    1/1999

OTHER PUBLICATIONS

Ozawa, "Water Jet Propulsion Watercarft", U.S. Appl. No. 12/644,874, filed Dec. 22, 2009.
Ozawa, "Water Jet Propulsion Watercarft", U.S. Appl. No. 13/616,059, filed Sep. 14, 2012.

* cited by examiner

*Primary Examiner* — Lars A Olson
*Assistant Examiner* — Anthony Wiest
(74) *Attorney, Agent, or Firm* — Keating & Bennett, LLP

(57) ABSTRACT

A water jet propulsion watercraft includes a first exhaust pipe that is fixed to an engine and connected to an exhaust port of the engine. A damper section reduces vibrations from the engine. A catalytic converter unit is connected to the first exhaust pipe. The catalytic converter unit is attached to the engine through the damper section. A second exhaust pipe includes a first flexible pipe having a flexible quality and is connected to the catalytic converter unit. A water lock is fixed to a hull of the watercraft and connected to the second exhaust pipe.

9 Claims, 18 Drawing Sheets

WATER JET PROPULSION WATERCRAFT

BACKGROUND OF THE INVENTION

1. Field of the Invention

The present invention relates to a water jet propulsion watercraft, and more specifically, to a water jet propulsion watercraft including a damper section that reduces vibrations transmitted from an engine to a catalytic converter unit.

2. Description of the Related Art

A water jet propulsion watercraft is conventionally provided with a catalytic converter arranged in an exhaust passage. For example, Laid-open Japanese Patent Application Publication 11-11393 discloses a water vehicle having a catalytic converter. The catalytic converter is supported on an intermediate exhaust pipe with a mounting flange. The intermediate exhaust pipe is fixed to a cylinder head of an engine with bolts.

The efficiency with which a catalytic converter treats exhaust gas improves when the exhaust gas is held at a higher temperature as it passes through the catalytic converter. Consequently, it is preferable for the length of an exhaust passage leading from an engine to a catalytic converter to be short. Thus, there are cases in which a catalytic converter unit containing a catalyst is fixed to an engine in order to arrange the catalytic converter closer to the engine.

However, in the case of Laid-open Japanese Patent Application Publication 11-11393, the intermediate exhaust pipe is fixed to a cylinder head of the engine with bolts. Consequently, vibrations of the engine are transmitted directly to the intermediate exhaust pipe and the catalytic converter. As a result, the catalytic converter unit is more likely to experience such troubles as the position of the catalyst shifting out of place and the catalyst becoming damaged. The catalytic converter unit is connected to a water lock. If the water lock is fixed to a hull of the watercraft, then it will be difficult for the water lock and the catalytic converter unit to vibrate in a coordinated manner even if vibrations from the engine cause the catalytic converter unit to vibrate. Consequently, a connecting portion between the water lock and the catalytic converter unit can easily become damaged.

SUMMARY OF THE INVENTION

In order to overcome the problems described above, preferred embodiments of the present invention provide a water jet propulsion watercraft including a catalytic converter arranged close to an engine such that trouble with an exhaust system caused by vibrations from the engine can be prevented.

A water jet propulsion watercraft according to a preferred embodiment of the present invention includes a hull, an engine, a jet propulsion unit, a first exhaust pipe, a damper section, a catalytic converter unit, a second exhaust pipe, and a water lock. The engine includes an exhaust port and is housed inside the hull. The jet propulsion unit is driven by the engine. The jet propulsion unit draws in water from around the hull and jets the water out. The first exhaust pipe is fixed to the engine and connected to the exhaust port. The damper section reduces vibrations from the engine. The catalytic converter unit is connected to the first exhaust pipe. The catalytic converter unit is attached to the engine through the damper section. The second exhaust pipe includes a first flexible pipe and is connected to the catalytic converter unit. The water lock is fixed to the hull and connected to the second exhaust pipe.

In the water jet propulsion watercraft, the catalytic converter is attached to the engine through the damper section. Consequently, the catalytic converter unit is arranged close to the engine. Vibrations transmitted from the engine to the catalytic converter unit are damped by the damper section. The second exhaust pipe is arranged between the catalytic converter unit and the water lock. The first flexible pipe of the second exhaust pipe has a flexible quality. Consequently, a difference between a vibration of the catalytic converter unit and a vibration of the water lock is absorbed by the first flexible pipe. As a result, the occurrence of damage at a connecting portion between the water lock and the catalytic converter unit is prevented. Thus, with a water jet propulsion watercraft according to preferred embodiments of the present invention, the catalytic converter is arranged close to the engine and damage to the exhaust system caused by vibrations from the engine can be prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A water jet propulsion watercraft according to preferred embodiments of the present invention will now be explained with reference to the drawings. In the figures, "FWD" indicates a forward movement direction of the watercraft and "BWD" indicates a reverse movement direction of the watercraft. "W" indicates a widthwise direction, i.e., a left-right direction, of the water jet propulsion watercraft.

Figure 1:
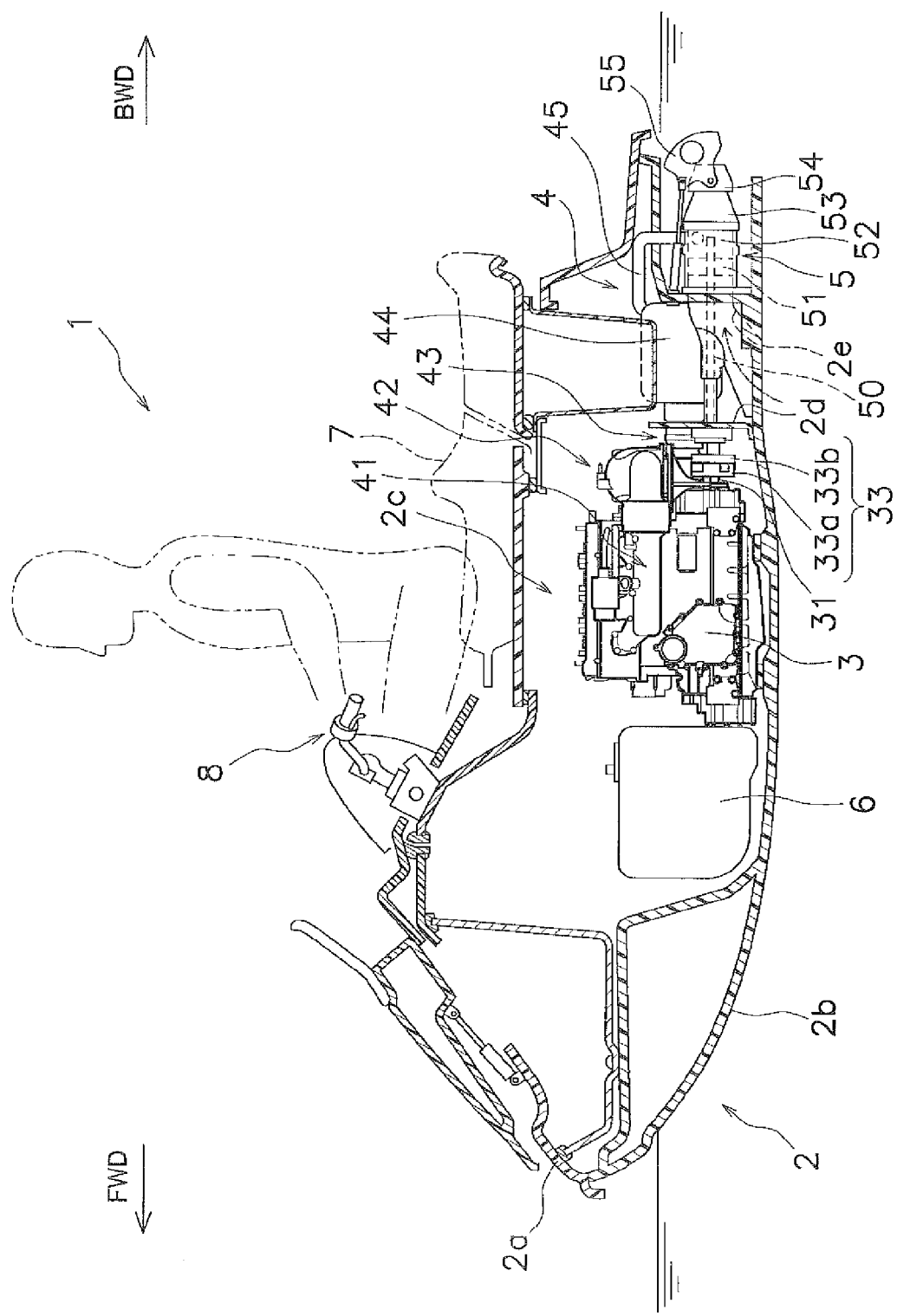
FIG. 1 is a sectional view showing an overall configuration of a water jet propulsion watercraft according to the first preferred embodiment of the present invention.

FIG. 1 is a sectional view showing an overall configuration of a water jet propulsion watercraft 1 according to the first preferred embodiment of the present invention. The water jet propulsion watercraft 1 preferably is a so-called personal watercraft (PWC). The water jet propulsion watercraft 1 includes a hull 2, an engine 3, an exhaust passage 4, and a jet propulsion unit 5. The hull 2 includes a deck 2a and a hull body 2b. The engine 3 is housed inside the hull 2. The jet propulsion unit 5 is driven by the engine 3. The exhaust passage 4 guides exhaust gas from the engine 3 to the outside of the hull 2. In other words, the exhaust passage 4 directs exhaust gas from the engine 3 into the water.

An engine room 2c is provided inside the hull 2. The engine 3 and a fuel tank 6 are housed inside the engine room 2c. A partitioning plate 2d is arranged in a rearward section of the engine room 2c. The partitioning plate 2d is arranged to extend vertically upward from the hull body 2b. The partitioning plate 2d partitions the inside of the hull 2 into a forward section and a rearward section. The partitioning plate 2d is configured to prevent the occurrence of rolling. Rolling is phenomenon in which the hull 2 twists about an axis oriented in a longitudinal direction of the hull 2. A seat 7 is attached to the deck 2a. The seat 7 is arranged above the engine 3. A steering mechanism 8 for steering the hull 2 is arranged in front of the seat 7.

In the explanations that follow, such directional terms as "front," "rear," "left," "right," and "diagonal" are used from the perspective of a rider sitting on the seat 7 while the water jet propulsion watercraft 1 is floating on still water.

The engine 3 is preferably an inline, four-cylinder, four-stroke engine, for example. The engine 3 includes a crankshaft 31. The crankshaft 31 is arranged to extend in a longitudinal direction. A coupling section 33 is arranged rearward of the crankshaft 31. The coupling section 33 connects an output shaft of the engine 3 to an input shaft of the jet propulsion unit 5. More specifically, the coupling section 33 includes a pair of couplings 33a and 33b. The coupling 33a is fixed to the crankshaft 31. The coupling 33b is fixed to an impeller shaft 50 explained below. The couplings 33a and 33b are connected to the crankshaft 31 and the impeller shaft 50. The couplings 33a and 33b serve to transmit rotation of the crankshaft 31 to the impeller shaft 50.

The exhaust passage 4 includes an exhaust manifold unit 41, a catalytic converter unit 42, an exhaust pipe section 43, a water lock 44, and an exhaust pipe 45. The constituent features of the exhaust passage 4 will be explained in more detail below.

The jet propulsion unit 5 draws in water from around the hull 2 and jets the water out. The jet propulsion unit 5 includes the impeller shaft 50, an impeller 51, an impeller housing 52, a nozzle 53, a deflector 54, and a bucket 55. The impeller shaft 50 is arranged to extend rearward from the engine room 2c and pass through the partitioning plate 2d. A rearward portion of the impeller shaft 50 passes through a water suction section 2e of the hull 2 and out through the inside of the impeller housing 52. The impeller housing 52 is connected to a rearward portion of the water suction section 2e. The nozzle 53 is arranged rearward of the impeller housing 52.

The impeller 51 is attached to a rearward portion of the impeller shaft 50. The impeller 51 is arranged inside the impeller housing 52. The impeller 51 rotates together with the impeller shaft 50 and draws in water from the water suction section 2e. The impeller 51 jets the drawn in water rearward from the nozzle 53. The deflector 54 is arranged rearward of the nozzle 53. The deflector 54 is configured to change a movement direction of water jetted from the nozzle 53 to a leftward or rightward direction. The bucket 55 is arranged rearward of the deflector 54. The bucket 55 is configured to change the movement direction of water jetted from the nozzle 53 and diverted by the deflector 54 to a forward direction.

Figure 2:
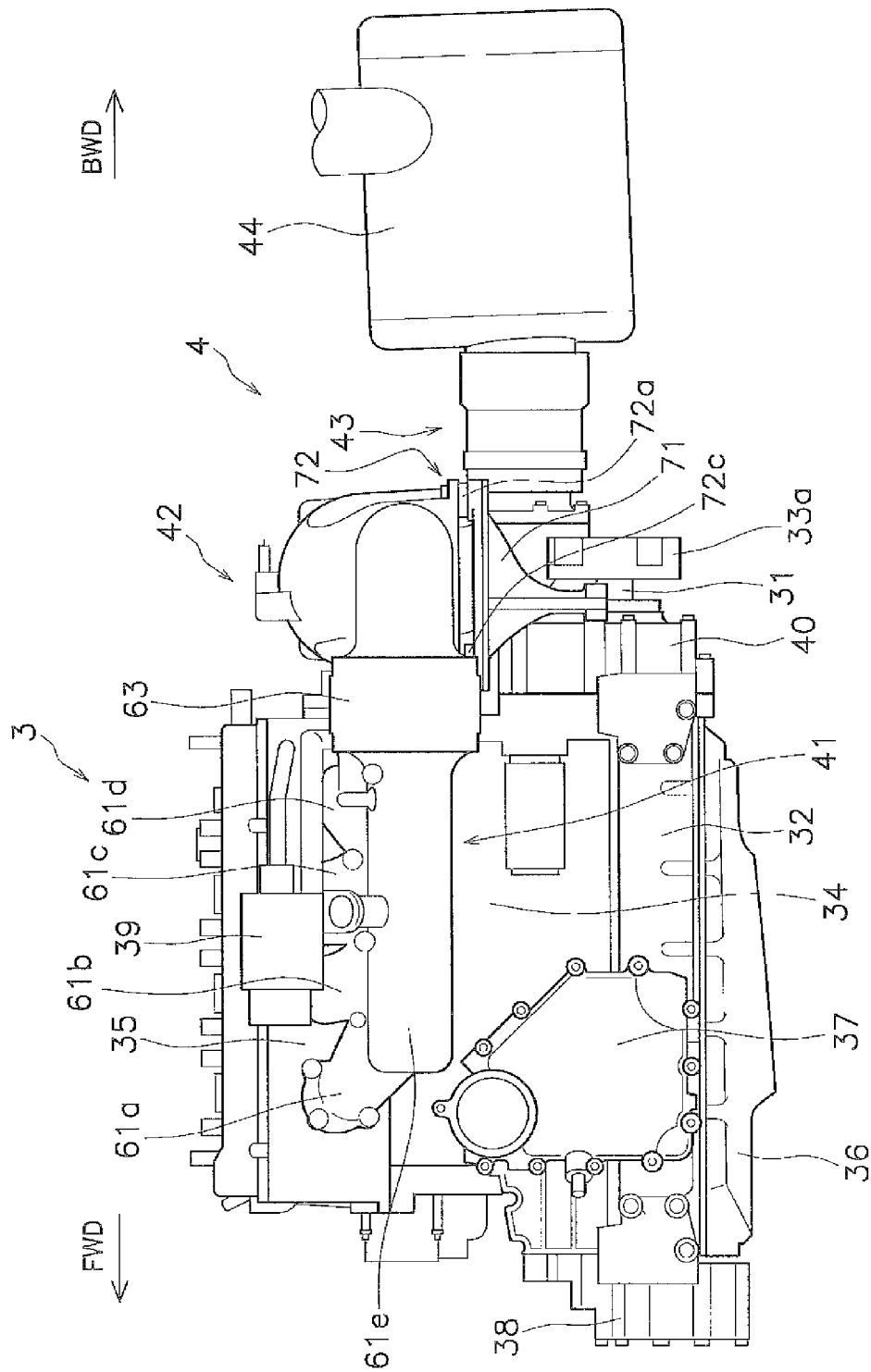
FIG. 2 is a side view of an engine and a portion of an exhaust passage.
Figure 3:
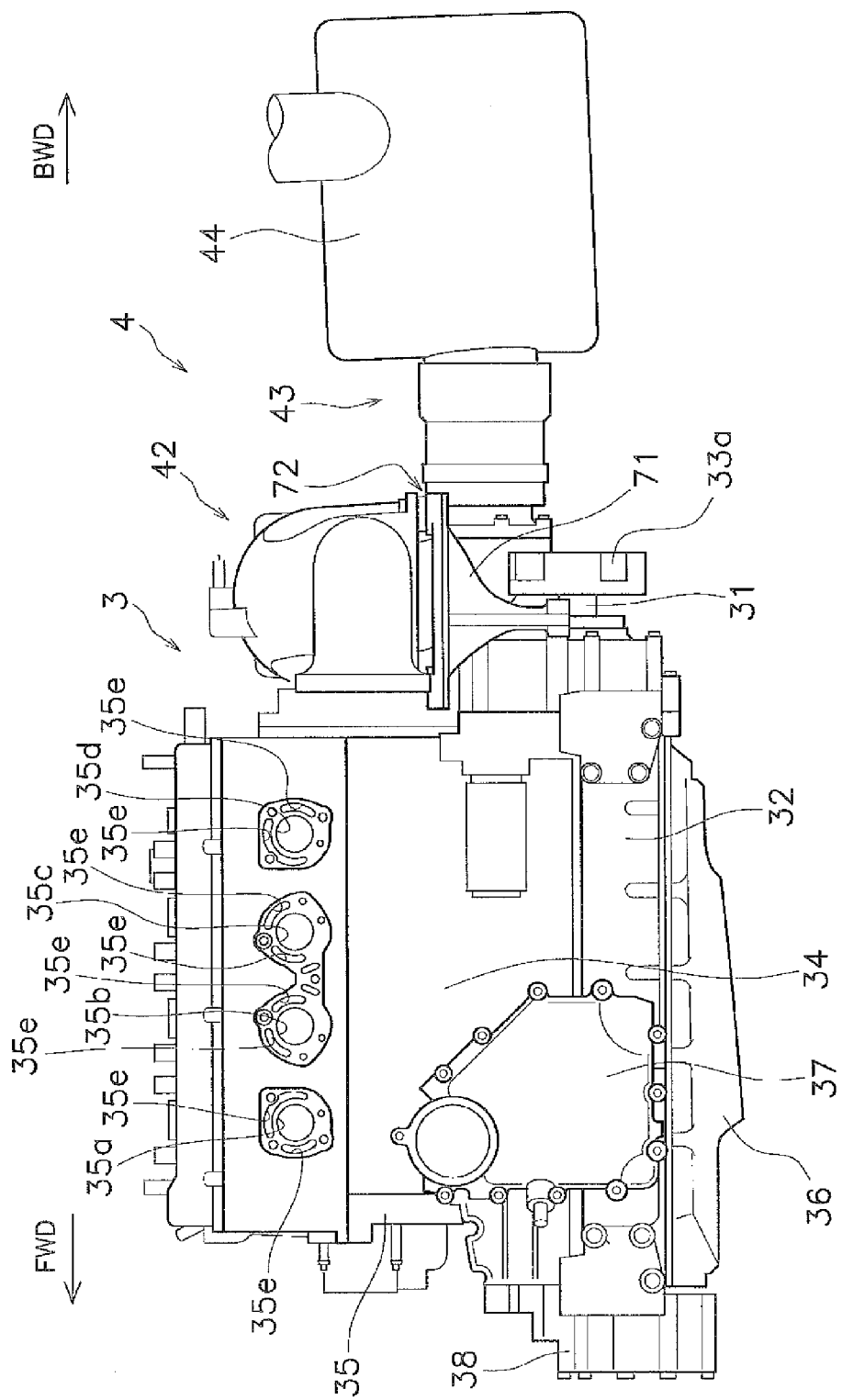
FIG. 3 is a side view of the engine and a portion of the exhaust passage with an exhaust manifold unit removed.

FIG. 2 is a side view of a portion of the engine 3 and the exhaust passage 4. FIG. 3 is a side view of a portion of the engine 3 and the exhaust passage 4 with the exhaust manifold unit 41 (explained below) removed. The engine 3 includes a crankcase 32, a plurality of cylinders 34, and a cylinder head 35. The crankcase 32 holds the aforementioned crankshaft 31. An oil pan 36 is attached to a bottom portion of the crankcase 32. An oil cooler 37 is arranged to one side of the crankcase 32. An oil pump 38 is attached to a forward portion of the crankcase 32. The oil pump 38 is driven by rotation of the crankshaft 31. The oil pump 38 picks up oil from the oil pan 36 and delivers the oil to the insides of the cylinders 34. The oil in the oil pan 36 is cooled by the oil cooler 37. The cylinders 34 and the cylinder head 35 are arranged above the crankcase 32. An electric power storage control device 39 is arranged to one side of the cylinders 34 and the cylinder head 35. The electric power storage control device 39 is a single device integrating a rectifier and a regulator. The rectifier rectifies alternating current generated by a generator (not shown) driven by the engine 3 into direct current. The regulator controls a voltage of electric power stored in a battery (not shown).

As shown in FIG. 3, the cylinder head 35 includes a plurality of exhaust ports 35a to 35d. In this preferred embodiment, the cylinder head 35 includes first to fourth exhaust ports 35a to 35d. Exhaust gas generated by the engine 3 is discharged to the outside of the engine 3 via the first to fourth exhaust ports 35a to 35d. The first to fourth exhaust ports 35a to 35d are provided on a side surface of the cylinder head 35. The first to fourth exhaust ports 35a to 35d are open in a lateral direction of the engine 3. The first to fourth exhaust ports 35a to 35d are arranged in order as listed from front to rear. That is, the first exhaust port 35a is the most forward among the first to fourth exhaust ports 35a to 35d, and the fourth exhaust port 35d is the most rearward among the first to fourth exhaust ports 35a to 35d. Water flow channels 35e are provided around a periphery of each of the first to fourth exhaust ports 35a to 35d. Water pumped by a water pump (not shown) flows through the flow channels 35e.

Figure 4:
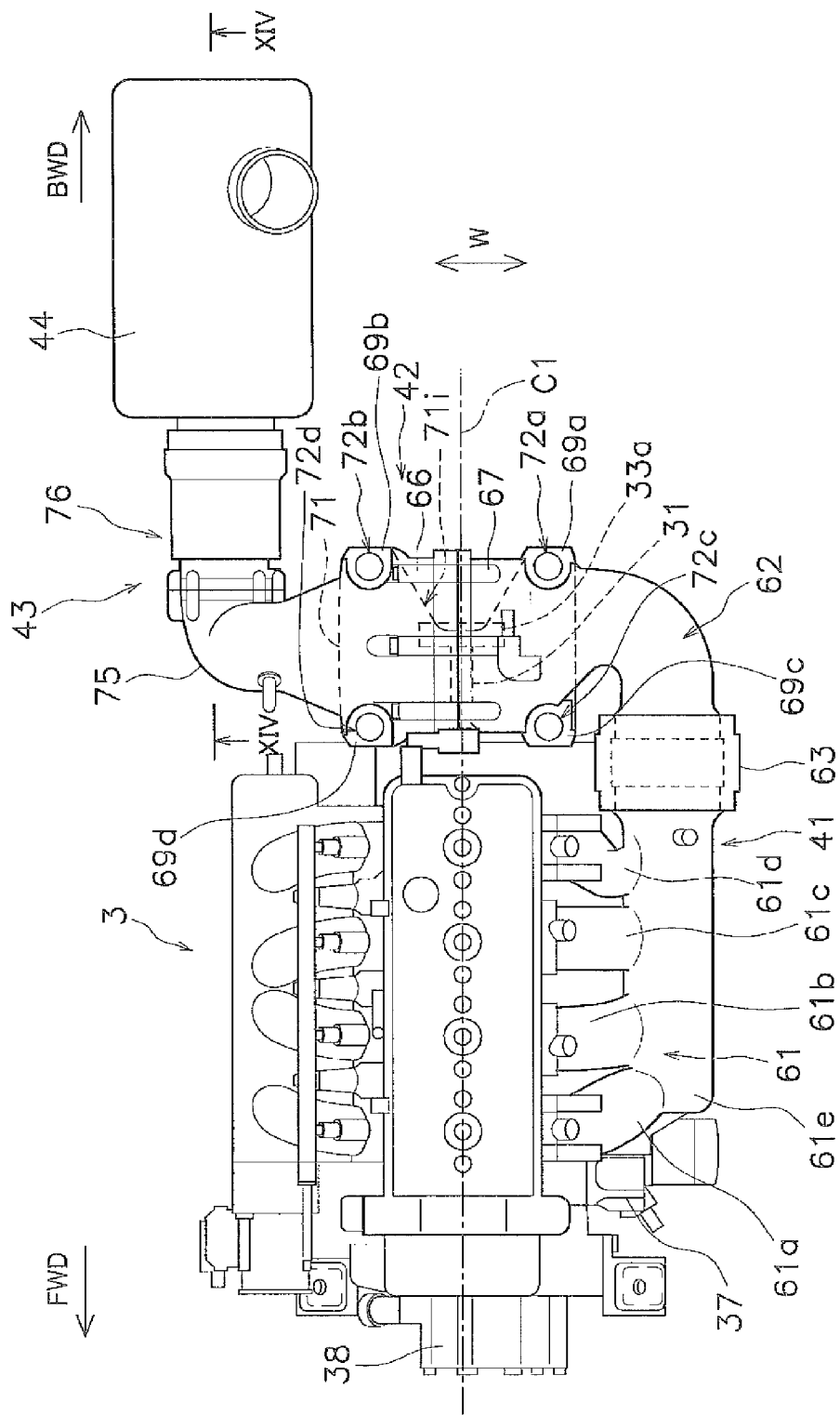
FIG. 4 is a plan view of the engine and a portion of the exhaust passage.

FIG. 4 is a plan view of the engine 3 and a portion of the exhaust passage 4. In FIG. 4, the electric power storage control device 39 shown in FIG. 2 is removed to facilitate understanding of the drawing. The exhaust manifold unit 41 is connected to the engine 3. The exhaust manifold unit 41 is attached to the first to fourth exhaust ports 35a to 35d. The exhaust manifold unit 41 guides exhaust gas discharged from the engine 3. The exhaust manifold unit 41 is connected between the engine 3 and the catalytic converter unit 42. The exhaust manifold unit 41 is an example of the "first exhaust pipe" according to a preferred embodiment of the present invention. The exhaust manifold unit 41 is fixed to the engine 3. More specifically, the exhaust manifold unit 41 is fixed to a side surface of the cylinder head 35 with bolts or other fastening members. The exhaust manifold unit 41 preferably extends in the longitudinal direction on one side of the engine 3. The exhaust manifold unit 41 is configured to curve toward the other side of the engine 3 at a position rearward of the engine 3.

The exhaust manifold unit 41 includes a front piping 61, a rear piping 62, and a joint section 63. The front piping 61 connects to the engine 3. The front piping 61 is preferably made of aluminum or another metal. The front piping 61 is arranged on one side of the engine 3 and extends in the longitudinal direction. The front piping 61 is arranged to face the side surface of the engine 3. The front piping 61 includes a plurality of branch sections 61a to 61d and a trunk section 61e. The branch sections 61a to 61d are each connected to the first to fourth exhaust ports 35a to 35d, respectively. The branch sections 61a to 61d are configured to extend laterally from the first to fourth exhaust ports 35a to 35d, respectively. More specifically, the branch sections 61a to 61d are configured to extend laterally and downward from the first to fourth exhaust ports 35a to 35d. In this preferred embodiment, the plurality of branch sections 61a to 61d are first to fourth branch sections 61a to 61d. The first to fourth branch sections 61a to 61d are arranged in order as listed from front to rear. That is, the first branch section 61a is the most forward among the first to fourth branch sections 61a to 61d and the fourth branch section 61d is the most rearward among the first to fourth branch sections 61a to 61d. The trunk section 61e is arranged on one side of the engine 3 and extends in the longitudinal direction. As shown in FIG. 2, an upper surface and a lower surface of the trunk section 61e are substantially horizontal in a side view. A diameter of the trunk section 61e is substantially uniform along the longitudinal direction. In a side view, an axial centerline AX1 (see FIG. 5) of the trunk section 61e is positioned below the first to fourth exhaust ports 35a to 35d.

Figure 5:
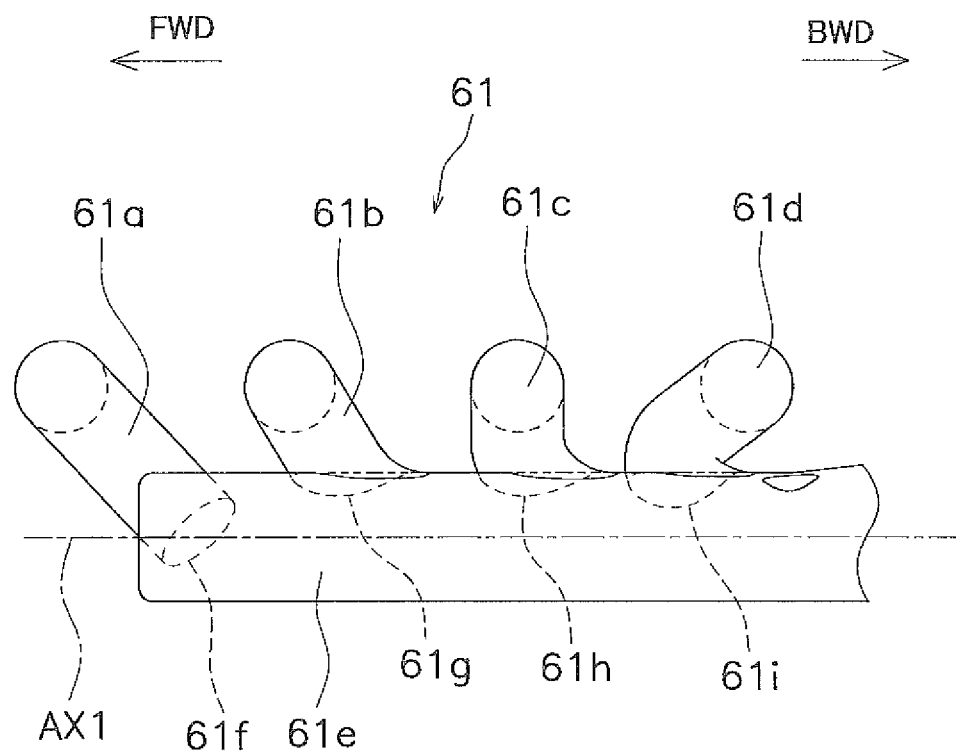
FIG. 5 is a side view of a front piping.

FIG. 5 is a side view of the front piping 61. The trunk section 61e is configured to merge the exhaust gases from the branch sections 61a to 61d. More specifically, the first to fourth branch sections 61d are each connected to the trunk section 61e. The trunk section 61e includes a plurality of connection openings 61f to 61i. That is, the connection openings 61f to 61i are first to fourth connection openings 61f to 61i. The first to fourth openings 61f to 61i are arranged in order as listed from front to rear. That is, the first connection opening 61f is the most forward among the first to fourth openings 61f to 61i and the fourth connection opening 61i is the most rearward among the first to fourth connection openings 61f to 61i. The first connection opening 61f connects to the first branch section 61a. The second connection opening 61g connects to the second branch section 61b. The third connection opening 61h connects to the third branch section 61c. The fourth connection opening 61i connects to the fourth branch section 61d.

As shown in FIG. 4, the joint section 63 connects the front piping 61 and the rear piping 62 together. The joint section 63 is arranged downstream of the front piping 61. The joint section 63 is arranged rearward of the front piping 61. The joint section 63 is preferably made of a flexible material, e.g., rubber or any other suitable flexible material. The joint section 63 preferably has a cylindrical shape. An external diameter of the joint section 63 is larger than an external diameter of the trunk section 61e. A downstream end portion of the front piping 61 is inserted into the joint section 63. As a result, the front piping 61 is connected to the joint section 63. The joint section 63 is an example of the "second flexible pipe" according to a preferred embodiment of the present invention.

The rear piping 62 is arranged downstream of the joint section 63. The rear piping 62 is arranged rearward of the joint section 63. The rear piping 62 is configured to curve toward the catalytic unit 42. The rear piping 62 is preferably made of aluminum or another metal, for example. An upstream end portion of the rear piping 62 is inserted into the joint section 63. As a result, the rear piping 62 is connected to the joint section 63.

Figure 6:
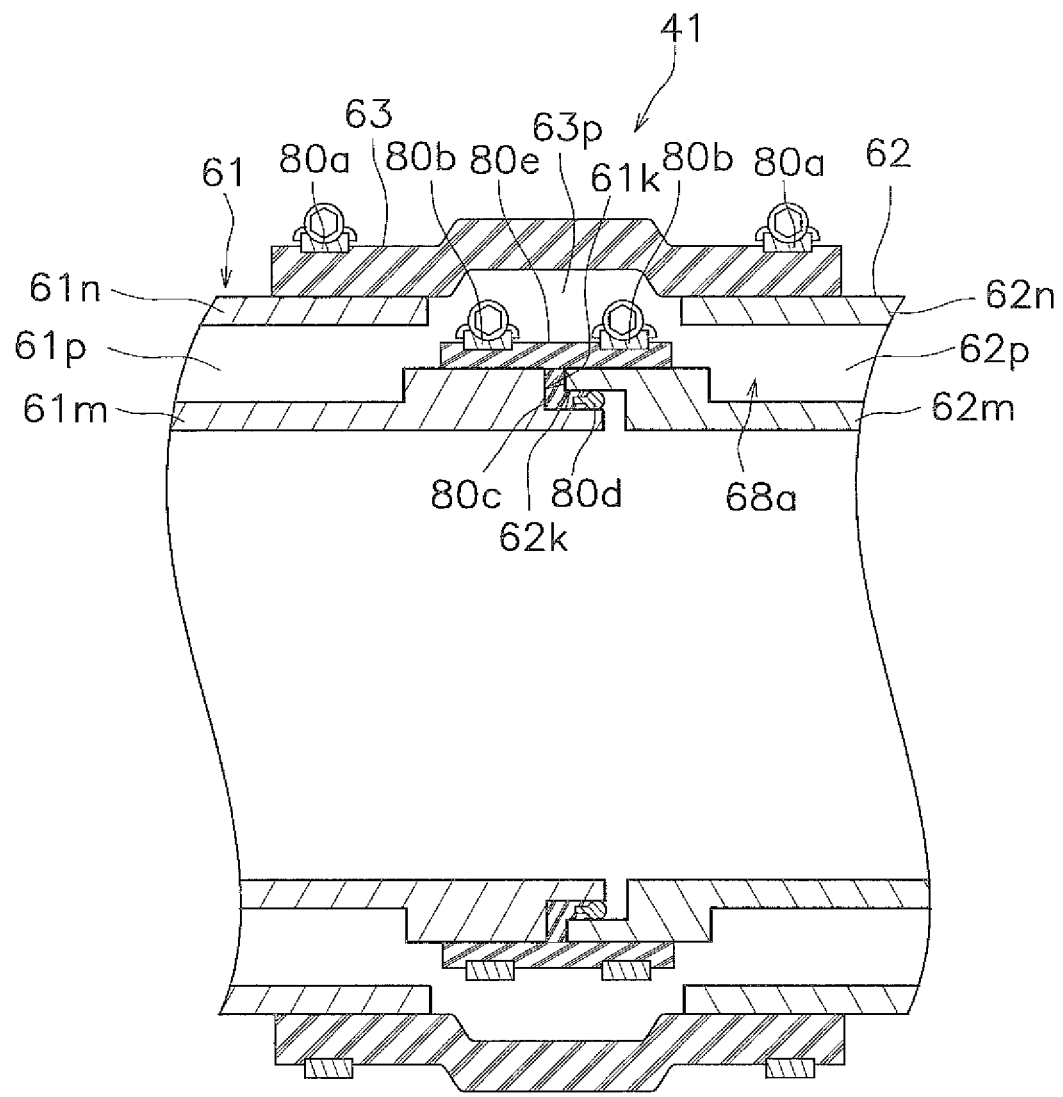
FIG. 6 is a sectional view of a joint section between the front piping and a rear piping.

FIG. 6 is sectional view of the front piping 61, the joint section 63, and the rear piping 62. As shown in FIG. 6, the front piping 61 includes a front inner pipe 61m and a front outer pipe 61n. A water jacket section 61p through which cooling water flows is provided between the front inner pipe 61m and the front outer pipe 61n. A downstream end portion of the front inner pipe 61m protrudes from a downstream end portion of the front outer pipe 61n. Similarly, the rear piping 62 includes a rear inner pipe 62m and a rear outer pipe 62n. A water jacket section 62p through which cooling water flows is provided between the rear inner pipe 62m and the rear outer pipe 62n. An upstream end portion of the rear inner pipe 62m protrudes from an upstream end portion of the rear outer pipe 62n. The joint section 63 spans across and covers an outer surface of the downstream end portion of the front outer pipe 61n and an outer surface of the upstream end portion of the rear outer pipe 62n. The joint section 63 is secured to the front outer pipe 61n and the rear outer pipe 62n with a band 80a including a tightening mechanism. A step section 61k is provided on a downstream end portion of the front inner pipe 61m. A step section 62k is provided on an upstream end portion of the rear inner pipe 62m. A gap that is L-shaped in a side sectional view is provided between the step section 61k of the front inner pipe 61m and the step section 62k of the rear inner pipe 62m. A seal ring 80c is installed in this gap. The seal ring 80c is preferably made of a thermally insulating rubber material, e.g., a silicon rubber. An elastic ring 80d preferably made of a heat-resistant metal is attached to the seal ring 80c. The elastic ring 80d is made, for example, by intertwining and compressing a plurality of stainless steel wires. Also, a sleeve 80e spans across and covers an outer surface of the downstream end portion of the front inner pipe 61m and the outer surface of the upstream end portion of the rear inner pipe 62m. The sleeve 80e is preferably made of a flexible material, e.g., rubber or any other suitable flexible material. The sleeve 80e is fixed to the front inner pipe 61m and the rear inner pipe 62m with a band 80b having a tightening mechanism. The water jacket section 61p of the front piping 61 and the water jacket section 62p of the rear piping 62 communicate with each other through a space 63p between an inner surface of the joint section 63 and an outer surface of the sleeve 80e. In this way, the water jacket section 61p of the front piping 61, the water jacket section 62p of the rear piping 62, and the space 63p between the inner surface of the joint section 63 and the outer surface of the sleeve 80e define a water jacket section 68a of the exhaust manifold unit 41. The water jacket section 61p of the front pipe 61 communicates with the water flow channels 35e (see FIG. 3) of the engine 3. Therefore, the water jacket section 68a of the exhaust manifold unit 41 communicates with the water flow channels 35e of the engine 3.

The catalytic converter unit 42 is arranged downstream of the rear piping 62. The catalytic converter unit 42 is connected to the exhaust manifold unit 41. The catalytic converter unit 42 is arranged to face a rear surface of the cylinder head 35 as viewed from the rear of the water jet propulsion watercraft 1.

Figure 7:
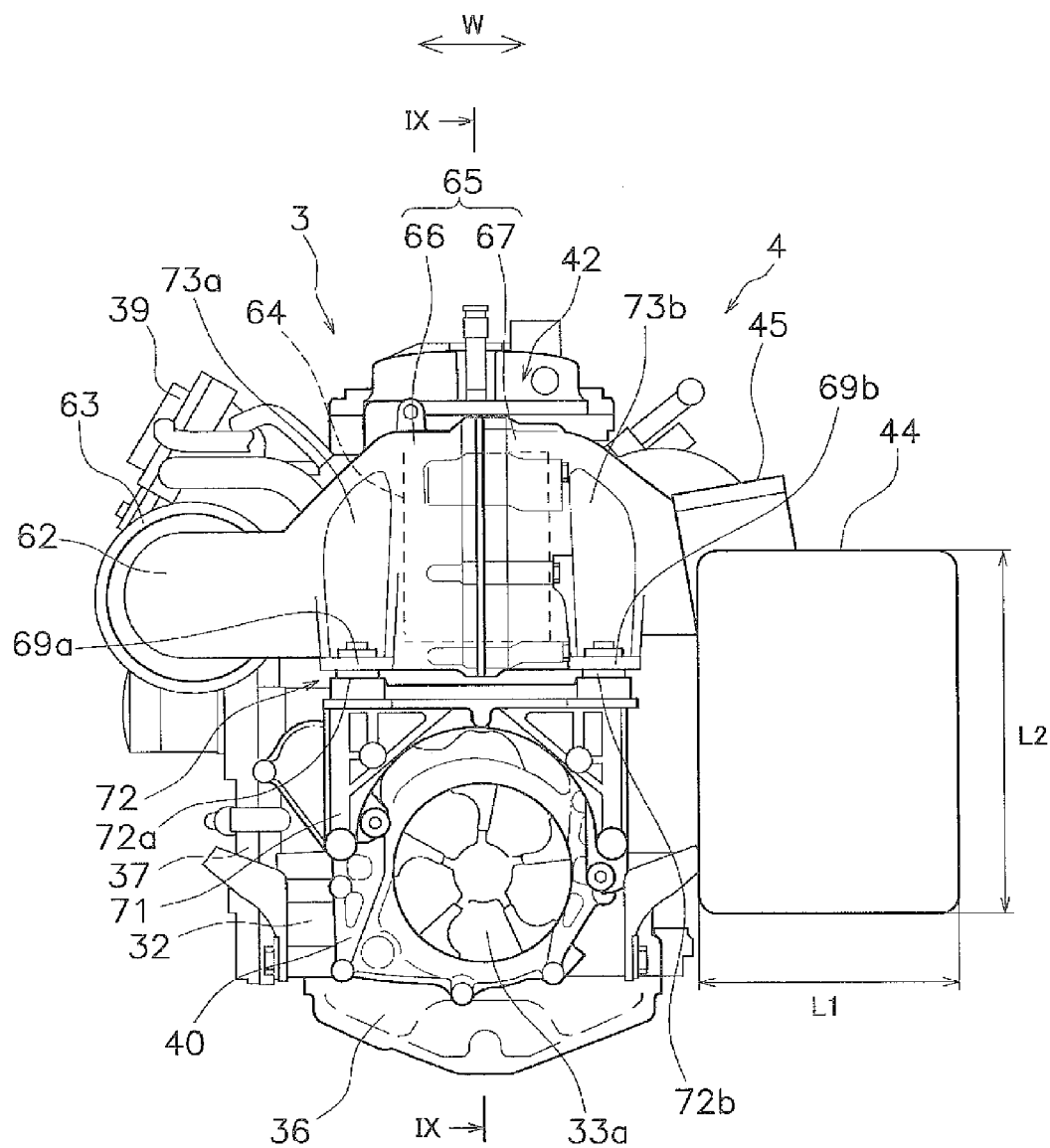
FIG. 7 is a plan view of the engine and a portion of the exhaust passage.
Figure 8:
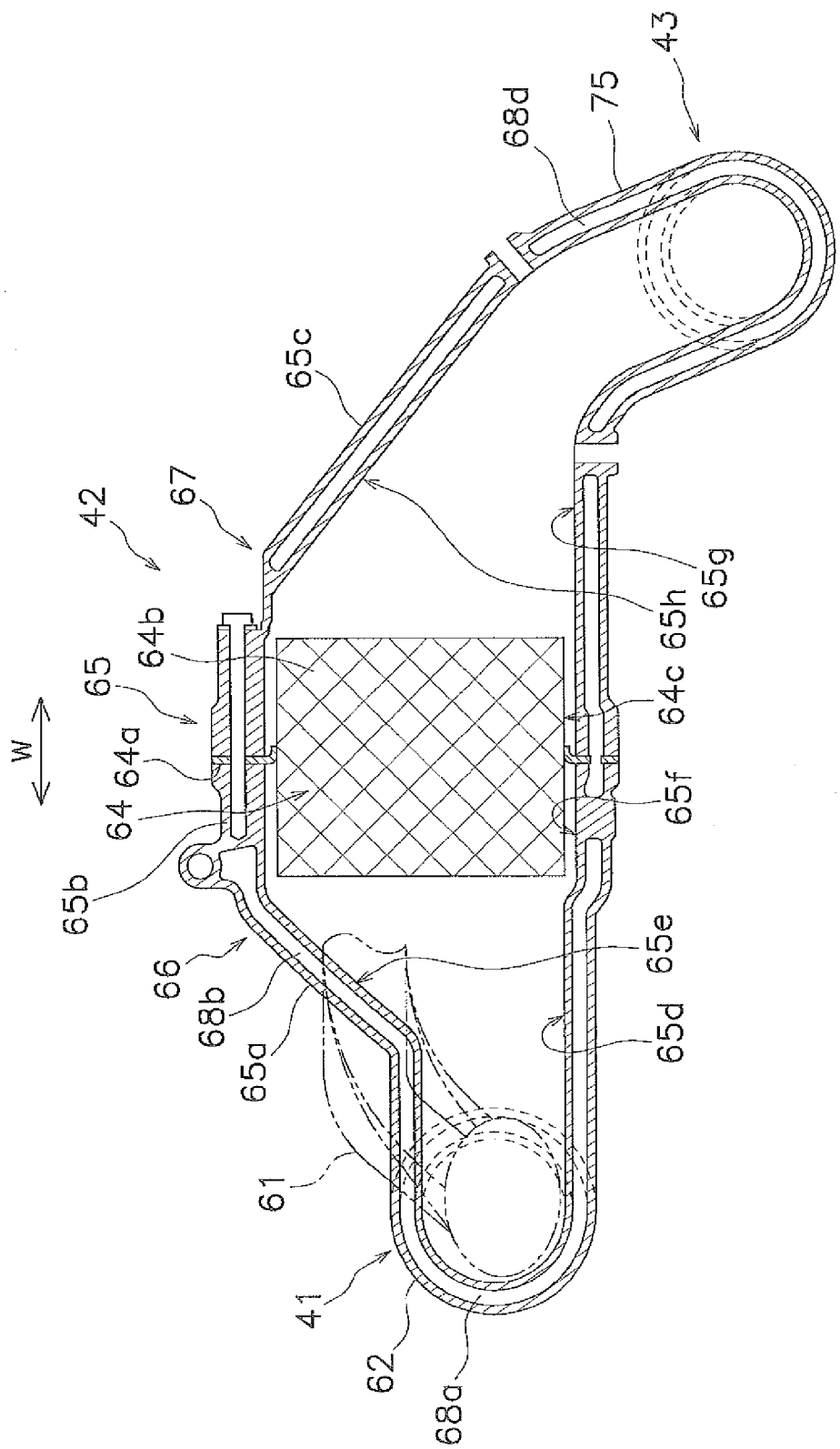
FIG. 8 is a sectional view of a catalytic converter unit.

FIG. 7 is a rear view of the engine 3 and a portion of the exhaust passage 4. FIG. 8 is a sectional view of the catalytic converter unit 42 along a vertical plane that includes an axial centerline of the catalytic converter unit 42. The catalytic converter unit 42 includes a catalyst member 64 and a catalyst housing pipe 65. The catalyst housing pipe 65 houses the catalyst member 64. The catalyst housing pipe 65 is preferably made of aluminum or another metal, for example. The catalyst housing pipe 65 is an example of the "pipe body" according to a preferred embodiment of the present invention. The catalyst member 64 is arranged inside the exhaust passage 4. The catalyst member 64 accelerates reactions of components (e.g., HC, CO, NOx) contained in exhaust gas. The catalyst member 64 can cause components (e.g., HC, CO, NOx) contained in the exhaust gas to react efficiently when it is at or above a prescribed temperature (for example, approximately 300° C.). Therefore, the catalyst member 64 is provided near the first to fourth exhaust ports 35a to 35d of the engine 3 such that the temperature of the exhaust gas will not decrease before the exhaust gas reaches the catalyst member 64.

More specifically, the catalytic converter unit 42 is arranged to face a rear surface of the cylinder head 35 of the engine 3. The catalytic converter unit 42 is arranged rearward of the cylinder head 35. The catalytic converter unit 42 is arranged extending along the widthwise direction of the water jet propulsion watercraft 1 in a region along a rear side of the cylinder head 35. As shown in FIG. 3, the catalytic converter unit 42 is arranged at approximately the same height position as the first to fourth exhaust ports 35a to 35d. As shown in FIG. 4, the catalytic converter unit 42 is arranged above the crankshaft 31 of the engine 3. The catalytic converter unit 42 is arranged to overlap a centerline C1 passing through the crankshaft 31 in a plan view of the engine. More specifically, in a plan view of the engine, a front portion of the catalytic converter unit 42 overlaps a rear end portion of the crankshaft 31.

The catalyst housing pipe 65 includes a first catalyst housing pipe 66 and a second catalyst housing pipe 67. The first catalyst housing pipe 66 and the second catalyst housing pipe 67 are separate entities. The first catalyst housing pipe 66 and the second catalyst housing pipe 67 are arranged adjacently along an axial direction of the catalytic converter unit 42. That is, the first catalyst housing pipe 66 and the second catalyst housing pipe are arranged adjacently along the widthwise direction of the water jet propulsion watercraft 1. The first catalyst housing pipe 66 is preferably formed as an integral or unitary unit with the rear piping 62. The second catalyst housing pipe 67 is preferably formed as an integral or unitary unit with an upstream pipe 75 of the exhaust pipe section 43 (explained below).

As shown in FIG. 8, the catalyst member 64 includes a flange section 64a and a catalyst carrier 64b. The catalyst carrier 64b is a cylindrical member that includes, for example, a honeycomb structure that holds the catalyst. The catalyst carrier 64b is preferably made of, for example, metal, but it is acceptable for the carrier to be made of ceramic or another material. The flange section 64a has an annular shape. The flange section 64a is fixed to an outer circumferential surface of the catalyst carrier 64b. The flange section 64a is configured to protrude outward in a radial direction from the outer circumferential surface of the catalyst carrier 64b. The catalyst member 64 is held in the catalyst housing pipe 65 by the flange section 64a being pinched between the first catalyst housing pipe 66 and the second catalyst housing pipe 67. The flange section 64a, the first catalyst housing pipe 66, and the second catalyst housing pipe 67 are fastened together with bolts or other fastening members.

The catalyst housing pipe 65 includes an increasing diameter section 65a, a straight section 65b, and a decreasing diameter section 65c. The increasing diameter section 65a is positioned upstream of the catalyst member 64. The increasing diameter section 65a is configured such that a cross-sectional area of the increasing diameter section 65a gradually increases as it extends in a downstream direction. A bottom section 65d of an inner surface of the increasing diameter section 65a is configured to extend horizontally in the widthwise direction of the water jet propulsion watercraft 1. An upper section 65e of the inner surface of the increasing diameter section 65a is sloped upward as it extends in the downstream direction. The straight section 65b is positioned between the increasing diameter section 65a and the decreasing diameter section 65c. The straight section 65b houses the catalyst member 64. A bottom section 65f of an inner surface of the straight section 65b is configured to extend horizontally in the widthwise direction of the water jet propulsion watercraft 1. The bottom section 65f of the inner surface of the straight section 65b is positioned lower than the bottom section 65d of the inner surface of the increasing diameter section 65a. The catalyst member 64 is arranged such that a gap exists with respect to the inner surface of the straight section 65b. A bottom section 64c of the catalyst carrier 64b is positioned at approximately the same height as the bottom section 65d of the inner surface of the increasing diameter section 65a. The decreasing diameter section 65c is positioned downstream of the catalyst member 64. The increasing diameter section 65c is configured such that a cross-sectional area of the decreasing diameter section 65c gradually decreases as it extends in a downstream direction. A bottom section 65g of an inner surface of the decreasing diameter section 65c is configured to extend horizontally in the widthwise direction of the water jet propulsion watercraft 1. An upper section 65h of the inner surface of the decreasing diameter section 65c is sloped downward as it extends in the downstream direction. The bottom sections of the inner surfaces of the exhaust manifold unit 41, the catalytic converter unit 42, and the exhaust pipe section 43 are configured such there are no portions where the bottom section of the inner surface rises as they proceed in the downstream direction.

Figure 9:
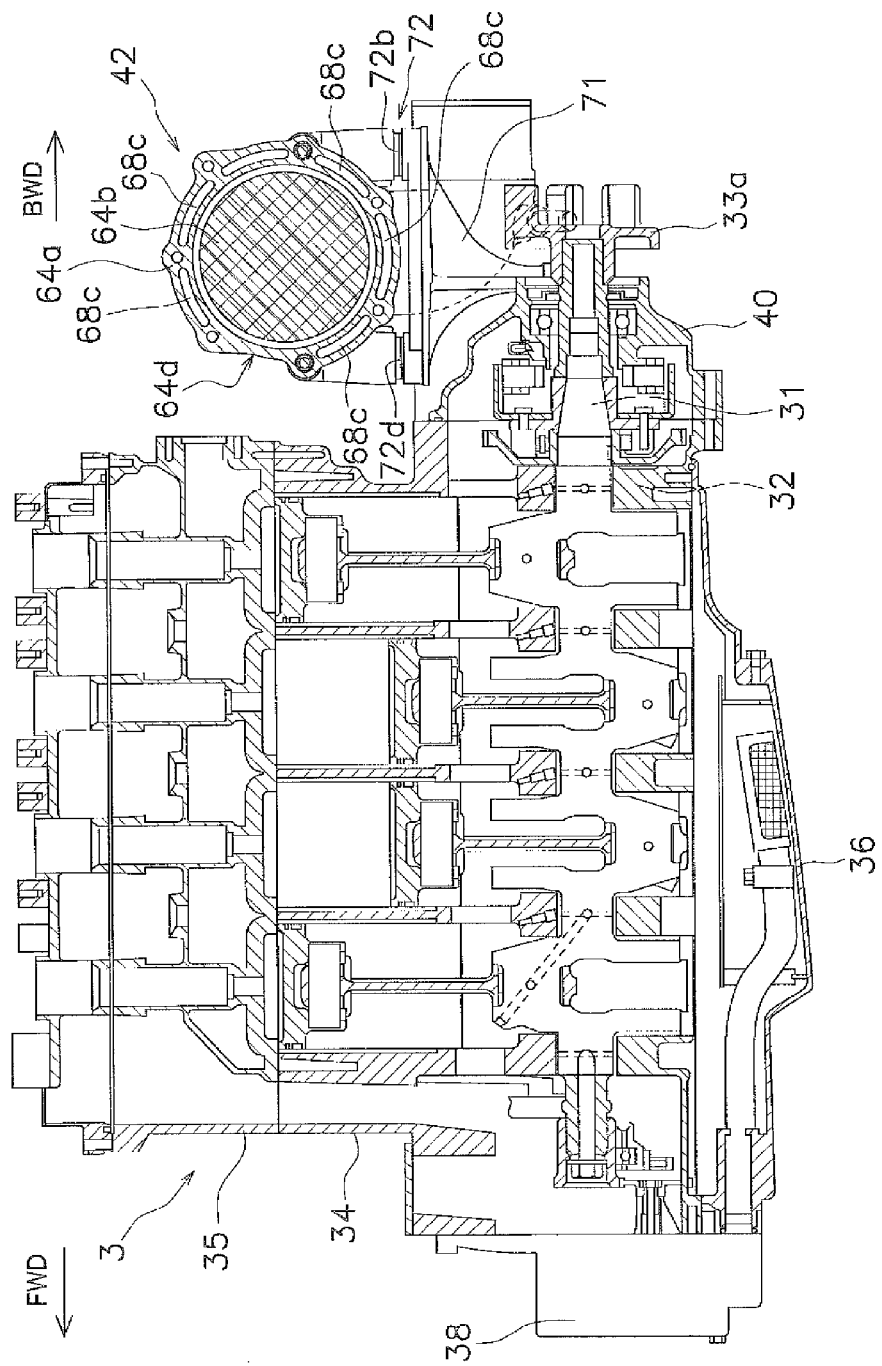
FIG. 9 is a sectional view taken along a section line IX-IX in FIG. 7.

A water jacket section 68b is provided in the catalyst housing pipe 65. The water jacket section 68b is arranged between an outer surface and an inner surface of the catalyst housing pipe 65 and defines a flow channel through which water can pass. The water jacket section 68b is configured to keep the catalytic converter unit 42 from reaching too high of a temperature due to the flow of exhaust gas. The water jacket section 68b of the catalytic converter unit 42 communicates with the aforementioned water jacket section 68a of the exhaust manifold unit 41. The water jacket section 68b is configured to surround a periphery of the catalyst member 64 through which exhaust gas flows. The catalytic converter unit 42 is cooled by the flow of water through the water jacket section 68b. FIG. 9 is a sectional view taken along a section line IX-IX of FIG. 7. As shown in FIG. 9, a water jacket section 68c is provided in the flange section 64a of catalyst member 64. The water jacket section 68c of the flange section 64a communicates with the water jacket section 68b of the catalyst housing pipe 65. In this way, the catalyst member 64 is cooled without water directly contacting the catalyst carrier 64b. As shown in FIG. 9, the water jacket section 68c is not provided in a portion of the flange section 64a that faces a cylinder head 35. A recessed section 64d is provided in the portion of the flange section 64a that faces the cylinder head 35. The recessed section 64d is shaped to recess toward an inward side of the flange section 64a. That is, the recessed section 64d is shaped to recess away from the cylinder head 35. Shaping the flange section 64a in this manner enlarges a gap between the flange section 64a and the cylinder head 35.

As shown in FIGS. 2, 4, and 7, the catalytic converter unit 42 is preferably supported on the engine 3 with a support bracket 71 and a damper section 72. The support bracket 71 is an example of the "support member" according to a preferred embodiment of the present invention. The support bracket 71 is arranged below the catalytic converter unit 42. The support bracket 71 is fixed to the engine 3. More specifically, the support bracket 71 is fixed to a cover member 40 (flywheel magnet cover) and the crankcase 32 of the engine 3. The cover member 40 is attached to a rear portion of the crankcase 32.

The damper section 72 reduces vibrations from the engine 3. The damper section 72 includes a plurality of dampers 72a to 72d, preferably made of rubber or another elastic material. More specifically, the damper section 72 includes first to fourth dampers 72a to 72d. The first to fourth dampers 72a to 72d are examples of the "elastic member" according to a preferred embodiment of the present invention. As shown in FIG. 4, the first damper 72a is arranged leftward of the center line C1 passing through the crankshaft 31. The second damper 72b is arranged rightward of the centerline C1 passing through the crankshaft 31. The third damper 72c is arranged forward of the first damper 72a. The third damper 72c is arranged leftward of the centerline C1 passing through the crankshaft 31. The fourth damper 72d is arranged forward of the second damper 72b. The fourth damper 72d is arranged rightward of the centerline C1 passing through the crankshaft 31. The first damper 72a and the second damper 72b are arranged rearward of an axial centerline C2 (see FIG. 10) of the catalyst member 64. The first damper 72a and the second damper 72b are arranged in positions farther from the engine 3 than the axial centerline C2 of the catalyst member 64 is. The third damper 72c and the fourth damper 72d are arranged forward of the axial centerline C2 of the catalyst member 64. The third damper 72c and the fourth damper 72b are arranged in positions closer to the engine 3 than the axial centerline C2 of the catalyst member 64 is.

Figure 10:
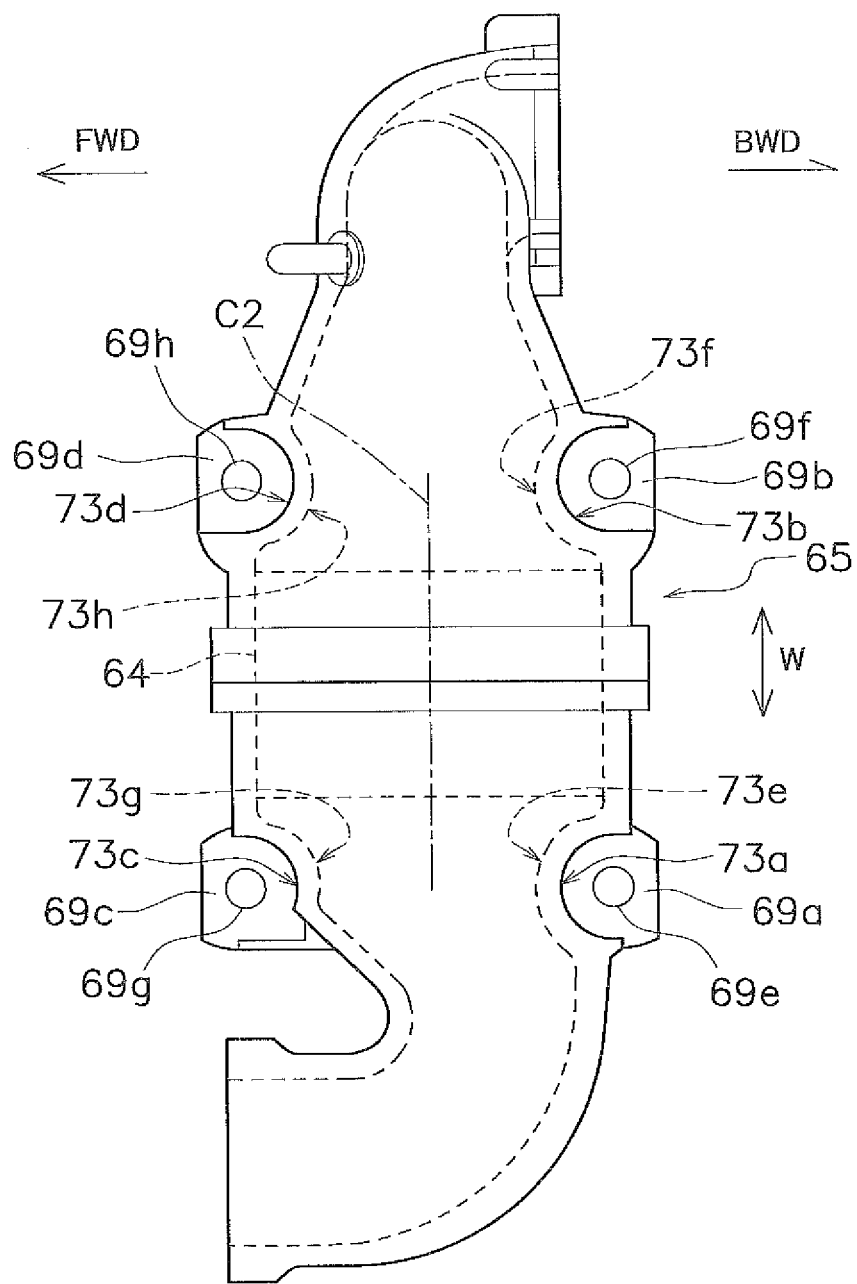
FIG. 10 is a plan view of the catalytic converter unit.
Figure 11:
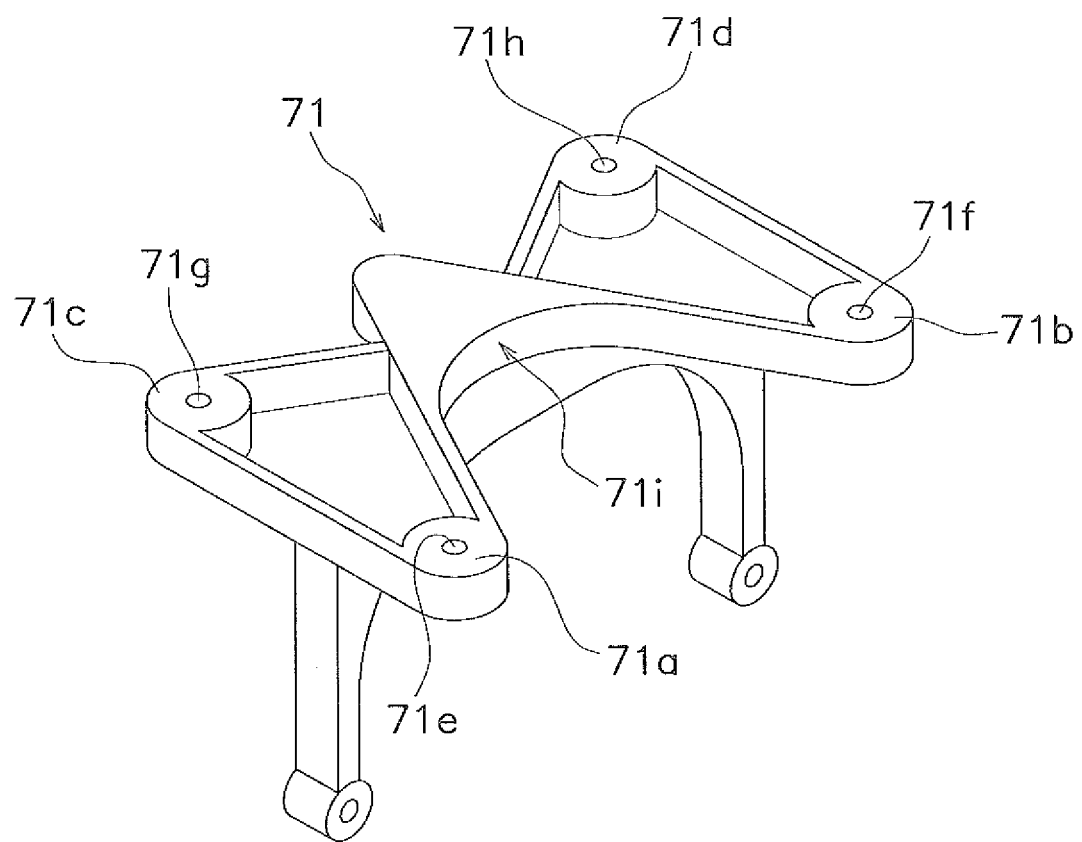
FIG. 11 is a perspective view of a support bracket.

The catalytic converter unit 42 is attached to the support bracket 71 through the first to fourth dampers 72a to 72d. The catalyst housing pipe 65 of the catalytic converter unit 65 includes first to fourth mounting sections 69a to 69d to attach the catalyst housing pipe 65 to the support bracket 71. Each of the first to fourth mounting sections 69a to 69d preferably has a plate-shaped configuration. The first to fourth mounting sections 69a to 69b are arranged to correspond to the first to fourth dampers 72a to 72d. FIG. 10 is a plan view of the catalytic converter unit 42. As shown in FIG. 10, first to fourth mounting holes 69e to 69h are provided in the first to fourth mounting sections 69a to 69d such that the holes extend in a vertical direction. FIG. 11 is a perspective view of the support bracket 71. As shown in FIG. 11, the support bracket 71 includes first to fourth support sections 71a to 71d. The first to fourth mounting sections 71a to 71d are arranged to correspond to the first to fourth dampers 72a to 72d. Holes 71e to 71h each configured for a bolt to pass through are provided in first to fourth support sections 71a to 71d. An upper surface of each of the first to fourth support sections 71a to 71d is flat to support the first to fourth dampers 72a to 72d.

Figure 12:
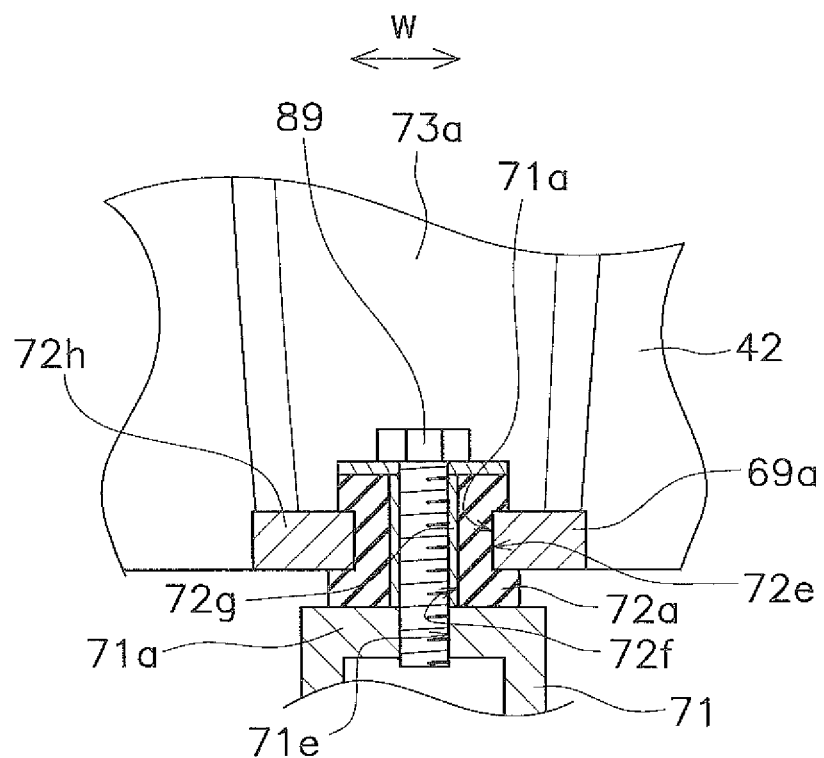
FIG. 12 is an enlarged sectional view showing a mounting structure between the catalytic converter unit and the support bracket.

FIG. 12 is an enlarged sectional view showing a mounting structure with which the catalytic converter 42 is attached to the support bracket 71 through the first damper 72a. The first damper 72a is installed into the first mounting hole 71a of the first mounting section 69a. The first damper 72a preferably has a cylindrical shape. An annular groove 72e is provided in an outer circumferential surface of the first damper 72a. The groove 72e meshes with a rim portion of the first mounting hole 71a. A through hole 72f is provided in the first damper 72a. A metal collar 72g is fitted into the through hole 72f. A bolt 89 is inserted through the collar 72g and a washer 72h and screwed into the hole 71e of the first support section 71a. The mounting structure between the catalytic converter unit 42 and the support bracket 71 is the same at the second to fourth dampers 72b to 72d as at the first damper 72a. In this way, the catalytic converter unit 42 is attached to the support bracket 71 through the first to fourth dampers 72a to 72d.

As shown in FIGS. 2 to 7, the catalytic converter unit 42 is supported in a vertical direction by the damper section 72. Meanwhile, exhaust gas passes through the catalytic converter unit 42 in a horizontal direction. More specifically, exhaust gas passes through the catalytic converter unit 42 in the widthwise direction of the water jet propulsion watercraft 1. Thus, the direction in which the catalytic converter unit 42 is supported by the damper section 72 is perpendicular or substantially perpendicular to the direction in which exhaust gas passes through the catalytic converter unit 42.

As shown in FIG. 7 and FIG. 10, first to fourth recessed sections 73a to 73d are provided in an outer surface of the catalyst housing pipe 65 of the catalytic converter unit 42. The first to fourth recessed sections 73a to 73d are positioned above the first to fourth mounting sections 69a to 69d. Thus, the first to fourth recessed sections 73a to 73d are positioned above the first to fourth mounting holes 69e to 69h. The first to fourth recessed sections 73a to 73d are configured to recess in an inward direction of the catalyst housing pipe 65 from an outer surface of the catalyst housing pipe 65. The first to fourth recessed sections 73a to 73d are configured to extend upward from the first to fourth mounting sections 69a to 69d. As shown in FIG. 10, the inner surface of the catalyst housing pipe 65 includes first to fourth curved sections 73e to 73h. The first to fourth curved sections 73e to 73h are positioned on back sides of the first to fourth recessed sections 73a to 73d, respectively. The first to fourth curved sections 73e to 73h are curved such that they protrude in an inward direction of the catalyst housing pipe 65. The first curved section 73e and the third curved section 73g are positioned upstream of the catalyst member 64. The second curved section 73f and the fourth curved section 73h are positioned downstream of the catalyst member 64. The catalyst member 64 is positioned between the first curved section 73e and the second curved section 73f along a widthwise direction of the water jet propulsion watercraft 1, i.e., the direction in which exhaust gas passes. The catalyst member 64 is positioned between the third curved section 73e and the fourth curved section 73h along a widthwise direction of the water jet propulsion watercraft 1, i.e., the direction in which exhaust gas passes.

Figure 13:
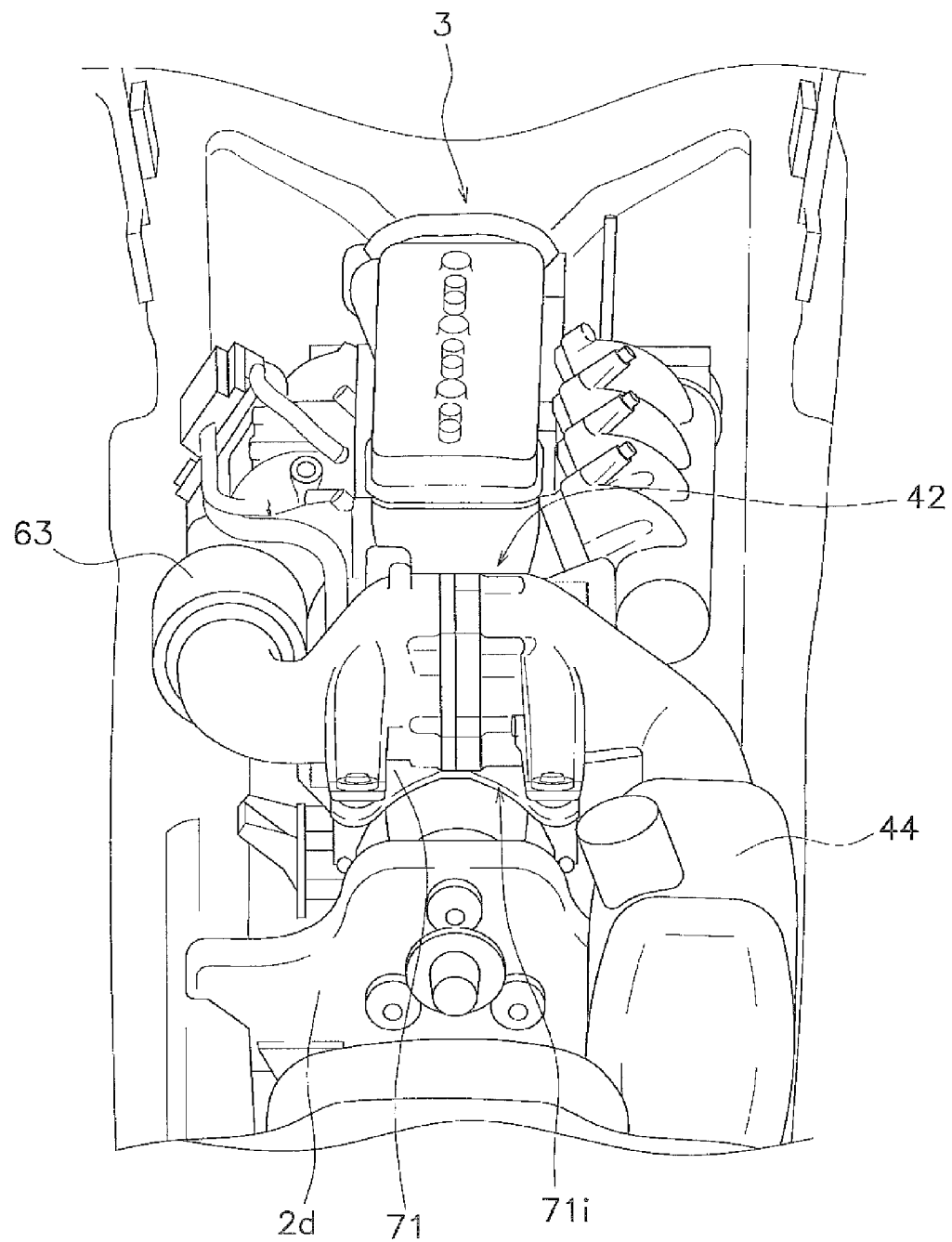
FIG. 13 shows the engine and a portion of the exhaust passage as viewed from above and behind.

As shown in FIG. 4, the support bracket 71 has a recessed shape at a portion positioned above the coupling section 33. More specifically, a recessed section 71i is provided in a rear portion of the support bracket 71. The recessed section 71i is configured to be recessed toward the engine 3 from the rear portion of the support bracket 71. As shown in FIG. 11, the recessed section 71i is positioned between the first support section 71a and a second support section 62b. As shown in FIG. 13, a position below the support bracket 71 can easily be seen when the engine 3 is viewed from a position above and rearward of the engine 3 or a position rearward of the engine 3.

As shown in FIG. 4, the exhaust pipe section 43 is arranged downstream of the catalytic converter unit 42. The exhaust pipe section 43 guides exhaust gas discharged from the engine 3. The exhaust pipe section 43 connects the catalytic converter unit 42 and the water lock 44 together. The exhaust pipe section 43 is an example of the "second exhaust pipe" according to a preferred embodiment of the present invention. The exhaust pipe section 43 is configured to curve rearward from a position near a portion where it connects to the catalytic converter unit 42. The exhaust pipe section 43 includes an upstream pipe 75 and a connecting pipe 76. As shown in FIG. 8, the upstream pipe 75 is configured to extend sideways and downward and curve toward the connecting pipe 76. The upstream pipe 75 is preferably made of aluminum or another metal, for example. A water jacket section 68*d* is provided in the upstream pipe 75. The water jacket section 68*d* of the upstream pipe 75 communicates with the water jacket section 68*b* of the catalyst housing pipe 65. A downstream end portion of the upstream pipe 75 is connected to the connecting pipe 76. The connecting pipe 76 connects the upstream pipe 75 and the water lock 44 together.

Figure 14:
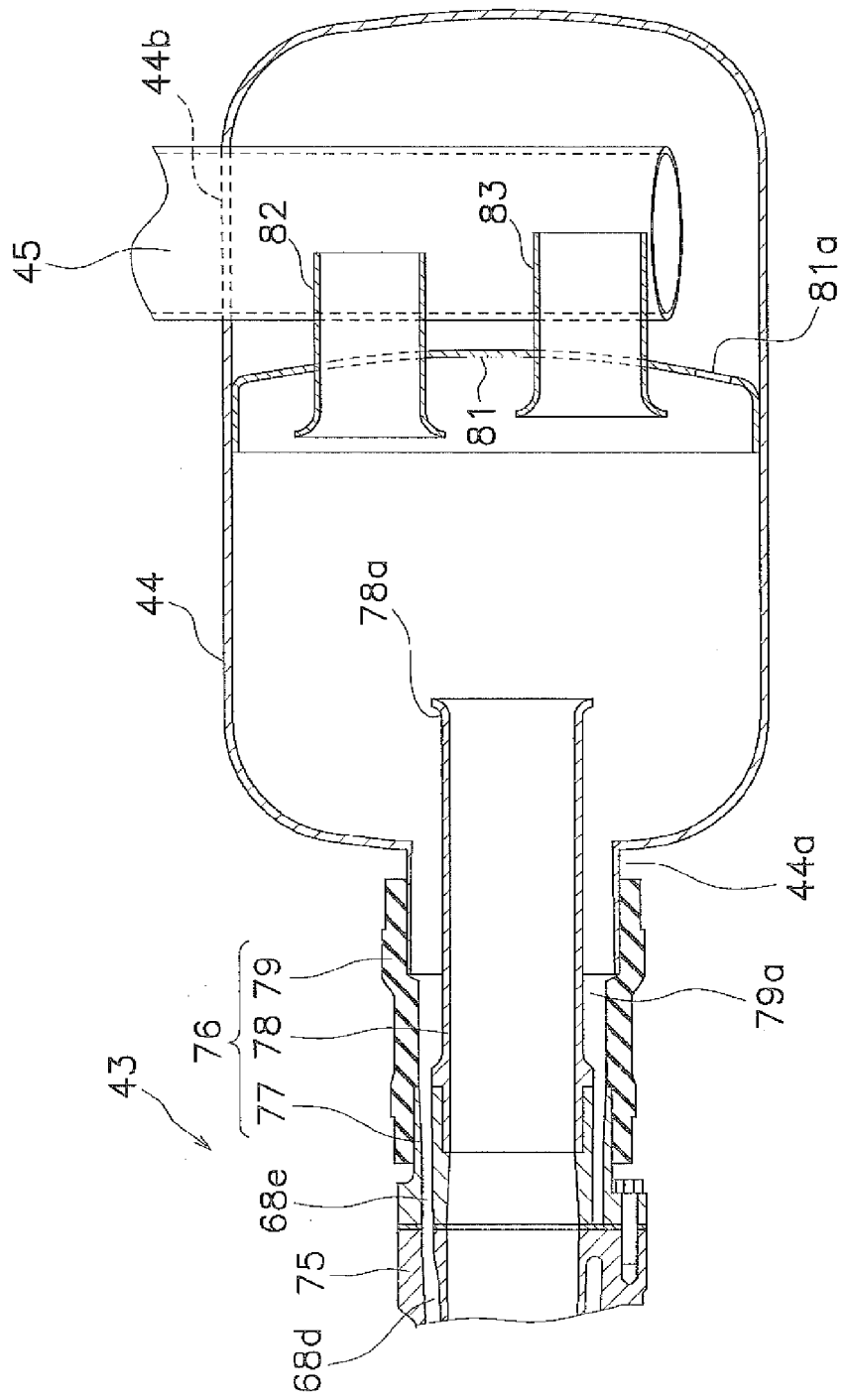
FIG. 14 is a partial sectional view taken along a section line XIV-XIV of FIG. 4.

FIG. 14 a partial sectional view taken along a section line XIV-XIV of FIG. 4. As shown in FIG. 14, the connecting pipe 76 includes a tailpipe 77, an inner pipe 78, and an exhaust hose 79. The tailpipe 77 is connected to a downstream end portion of the upstream pipe 75. The tailpipe 77 is preferably made of aluminum or another metal, for example. The tailpipe 77 is fastened to the upstream pipe 75 with bolts or other fastening members. The tailpipe 77 is arranged to extend in the longitudinal direction of the water jet propulsion watercraft 1. A water jacket section 68*e* is provided in the tailpipe 77. The water jacket section 68*e* of the tailpipe 77 communicates with the water jacket section 68*d* of the upstream pipe 75.

The exhaust hose 79 is configured to extend toward the water lock 44 from a downstream end portion of an outer circumferential surface of the tail pipe 77. The exhaust hose 79 has a cylindrical shape and is preferably made of a flexible material, e.g., rubber or any other suitable flexible material. The exhaust hose 79 is an example of the "first flexible pipe" according to a preferred embodiment of the present invention. A downstream end portion of the tailpipe 77 is inserted into the exhaust hose 79. The exhaust hose 79 is thus connected to the tailpipe 77.

The inner pipe 78 is arranged inside the exhaust hose 79. The inner pipe 78 is arranged to extend into the water lock 44 from a downstream end portion of an inner circumferential surface of the exhaust hose 79. The inner pipe 78 is, for example, a cylindrical pipe preferably made of aluminum or another metal. A tip end portion (downstream end portion) of the inner pipe 78 defines a widened section 78*a* configured such that its diameter gradually increases toward the tip end. The widened section 78*a* preferably has a smoothly curved bell mouth shape. An upstream end portion of the inner pipe 78 screws into an internal surface of a downstream end portion of the tailpipe 77. In this way, the inner pipe 78 is fixed to the tail pipe 77. The downstream end portion of the inner pipe 78 is positioned in the interior of the water lock 44.

An external diameter of the inner pipe 78 is smaller than an internal diameter of the exhaust hose 79. Consequently, a cooling water flow channel 79*a* is provided between an outer circumferential surface of the inner pipe 78 and an inner circumferential surface of the exhaust hose 79. The cooling water flow channel 79*a* communicates with the water jacket section 68*e* of the tailpipe 77. The cooling water flow channel 79*a* communicates with an internal space of the water lock 44.

As shown in FIG. 8 and FIG. 14, a bottom portion of an inner surface of the exhaust pipe section 43 is configured such that there are no portions that slope upward in the downstream direction. More specifically, a bottom portion of an inner surface of the upstream pipe 75 of the exhaust pipe section 43 is configured such that it slopes downward in the downstream direction. Also, a bottom portion of an inner surface of the connecting pipe 76 is configured to extend horizontally toward the water lock 44.

The water lock 44 is arranged such that its lengthwise direction extends in the longitudinal direction of the water jet propulsion watercraft 1. The water lock 44 is connected to a downstream end portion of the exhaust pipe section 43. Thus, the water lock 44 is arranged downstream of the catalyst member 64 in the exhaust passage 4. The water lock 44 is connected to the exhaust pipe 45 (see FIG. 1). A tip end of the exhaust pipe 45 is arranged outside the hull 2 and exhaust gas is discharged to the outside of the hull 2 from the exhaust pipe 45. Thus, the exhaust gas is discharged from the exhaust pipe 45 into the water. The water lock 44 is configured to prevent water that has entered the exhaust pipe 45 from flowing inward toward the engine 3. The water lock 44 is fixed to the hull 2. As shown in FIG. 2, a bottom portion of the water lock 44 is arranged lower than a bottom portion of the catalytic converter unit 42. As shown in FIG. 7, a widthwise dimension L1 of the water lock 44 is smaller than a vertical dimension L2 of the water lock 44.

As shown in FIG. 14, the water lock 44 preferably has the form of a sealed tank. A cylindrical connecting section 44*a* is provided on an upstream end portion of the water lock 44. The connecting section 44*a* is inserted into the exhaust hose 79. As a result, a downstream end portion of the exhaust hose 79 is connected to the connecting section 44*a*. The interior of the water lock 44 is partitioned into an upstream portion and a downstream portion by a partition 81. The partition 81 includes a plate-shaped member. The partition 81 is curved such that it bulges out in a downstream direction. A pair of partition pipes 82 and 83 is also arranged inside the water lock 44. The partition pipes 82 and 83 are arranged spaced apart in a vertical direction. The partition pipes 82 and 83 pass through the partition 81. A water drainage hole 81*a* is provided in a lower portion of the partition 81. Cooling water collected in the upstream portion of the interior of the water lock 44 drains to the downstream portion through the water drainage hole 81. A mounting hole 44*b* is provided in an upper surface of the water lock 44. An upstream end portion of the exhaust pipe 45 passes through the mounting hole 44*b* such that it is inserted into a downstream portion of the water lock 44. The upstream end portion of the exhaust pipe 45 extends to a position near a bottom portion of the water lock 44.

The exhaust manifold unit 41 connects to the catalytic converter unit 42, and the catalytic converter unit 42 is arranged to face a rear surface of the engine 3. As a result, a passage length of the exhaust passage 4 is short between the first to fourth exhaust ports 35*a* to 35*d* of the engine 3 and the catalytic converter unit 42. As a result, high-temperature exhaust gas can be delivered to the catalytic converter unit 42 and, thus, the catalytic converter unit 42 can be activated quickly after the engine 3 is started. In this way, harmful components (e.g., HC, CO, and NOx) contained in the exhaust gas can be reacted sufficiently in the catalytic converter unit 42 and the exhaust gas can be cleaned in an efficient manner. Additionally, since the catalytic converter unit 42 is arranged close to the engine 3, heavy components can be arranged such that they are concentrated at the center of the hull with respect to the widthwise direction of the water jet propulsion watercraft 1 and toward the rear with respect to the longitudinal direction of the water jet propulsion watercraft 1. In this way, the lateral balance between the left and right sides of the water jet propulsion watercraft 1 can be improved. Also, the components of the engine 3 and the exhaust system can be arranged in a compact fashion.

The catalytic converter unit 42 is supported on a support bracket 71 through a damper section 72. The damper section 72 enables vibrations occurring when the engine 3 is driven to be damped. Thus, the direct transmission of vibrations from the engine 3 to the catalytic converter 42 can be prevented. In this way, the occurrence of such problems of the catalytic converter unit 42 as the position of the catalyst member 64 shifting out of place or the catalyst member 64 becoming damaged can be prevented. In particular, with a catalytic converter unit 42 structured as explained heretofore, the fixed state between the catalyst carrier 64b and the flange section 64a is less likely to become loose due to vibrations and the catalyst carrier 64b is less likely to move with respect to the flange section 64a due to vibrations.

The exhaust hose 79 of the exhaust pipe section 43 is preferably made of a flexible material and therefore has a flexible quality. Consequently, a difference between a vibration of the catalytic converter unit 42 and a vibration of the water lock 44 is absorbed by the exhaust hose 79. As a result, the occurrence of damage at a connecting portion between the water lock 44 and the catalytic converter unit 42 is prevented. The joint section 63 of the exhaust manifold unit 41 is also preferably made of a flexible material and therefore also has a flexible quality. Consequently, a difference between a vibration of the catalytic converter unit 42 and a vibration of the front piping 61 is absorbed by the joint section 63. As a result, the occurrence of damage at a connecting portion between the front piping 61 and the catalytic converter unit 42 is prevented. Thus, with the water jet propulsion watercraft 1 configured according to this preferred embodiment, the catalytic converter unit 42 is arranged close to the engine 3 and trouble with the exhaust system caused by vibrations from the engine 3 can be prevented.

The first to fourth dampers 72a to 72d are arranged to the left and right of a centerline C1 passing through the crankshaft 31. Consequently, vibrations from the engine 3 are effectively absorbed by the damper section 72.

The catalytic converter unit 42 is arranged to overlap the centerline C1 passing through the crankshaft 31 in a plan view. As a result, the lateral balance between the left and right sides of the water jet propulsion watercraft 1 can be improved.

The direction in which the catalytic converter unit 42 is supported by the damper section 72 is perpendicular or substantially perpendicular to the direction in which exhaust gas passes through the catalytic converter unit 42. Consequently, the catalyst member 64 can be prevented from shifting out of position due to vibrations of the catalytic converter unit 42.

The recessed section 71i is provided on the support bracket 71. As shown in FIG. 13, a position below the support bracket 71 can easily be seen when the engine 3 is viewed from a position above and rearward of the engine 3 or a position rearward of the engine 3. Consequently, the support bracket 71 does not become an obstruction to checking the positions of the couplings 33a and 33b. As a result, the task of connecting the couplings 33a and 33b can be accomplished more readily.

The curved sections 73e to 73h are provided on an inner surface of the catalyst housing pipe 65. Exhaust gas is guided inside the catalyst housing pipe 65 by the curved sections 73e to 73h. More particularly, although the flow of the exhaust gas turns through substantially a right angle at the rear piping 62, the first curved section 73e guides the flow toward a center of the catalyst member 64. Thus, a situation in which a large quantity of exhaust gas flows disproportionately to a certain portion of the catalyst member 64 can be prevented. As a result, the treatment efficiency achieved by the catalyst member 64 can be improved.

Although preferred embodiments of the present invention have been described above, the present invention is not limited to the preferred embodiments described above. Various changes can be made without departing from the scope of the present invention.

Figure 15:
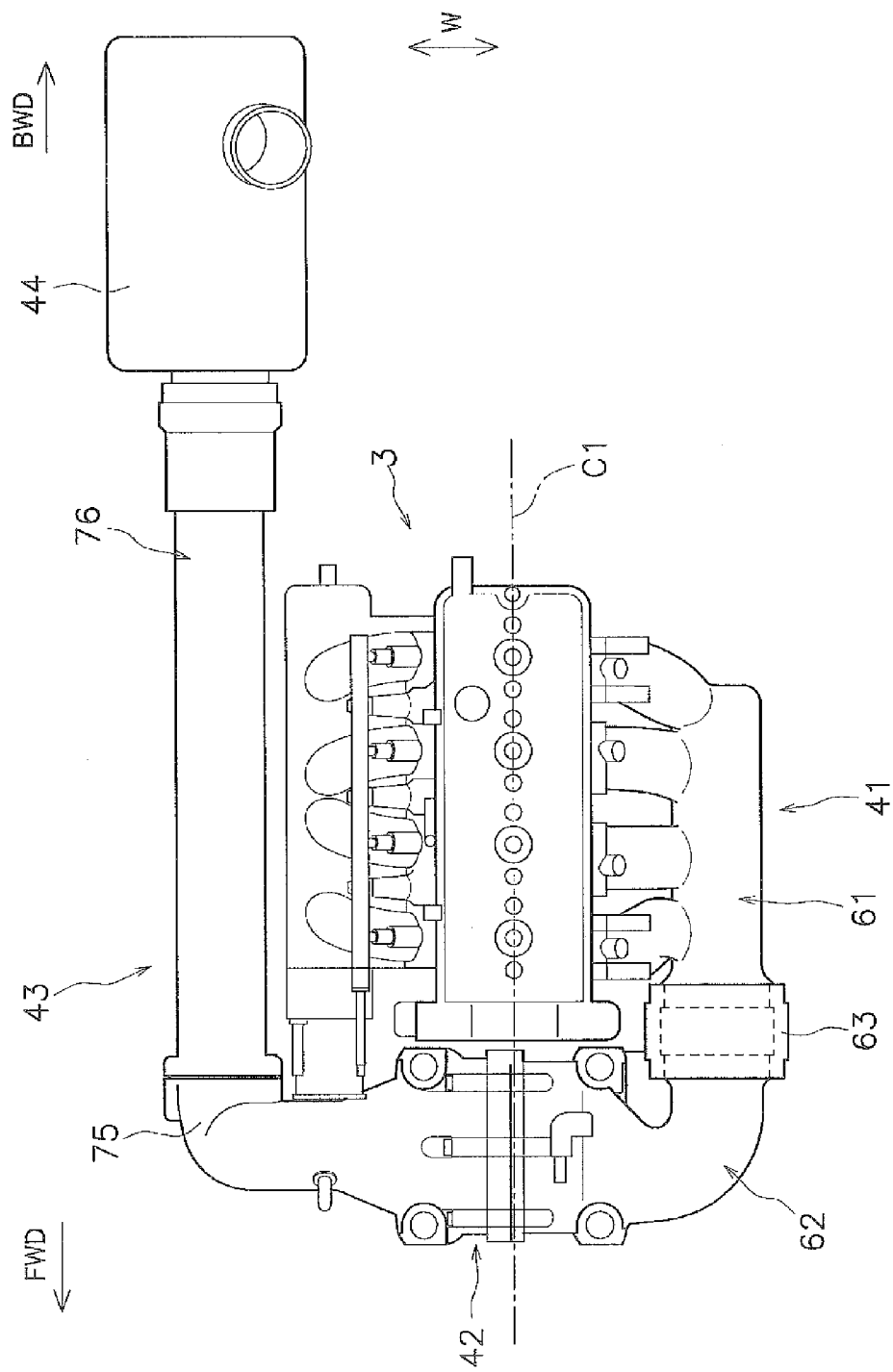
FIG. 15 is a plan view showing an engine and a portion of an exhaust passage according to the second preferred embodiment of the present invention.

Although the catalytic converter unit 42 is preferably arranged to face a rear surface of the engine 3 in the previously explained preferred embodiment, the present invention is not limited to arranging the catalytic converter unit 42 in such a position. For example, as shown in FIG. 15, it is acceptable to arrange the catalytic converter unit 42 along a front surface of the engine 3. It is also acceptable to arrange the catalytic converter unit 42 along a side surface of the engine 3. The number of dampers is not limited to four as presented in the previously explained preferred embodiment. A number smaller than four or a number larger than four is also acceptable. The number of exhaust ports is not limited to four as presented in the previously explained preferred embodiment. A number smaller than four or a number larger than four is also acceptable.

Figure 16:
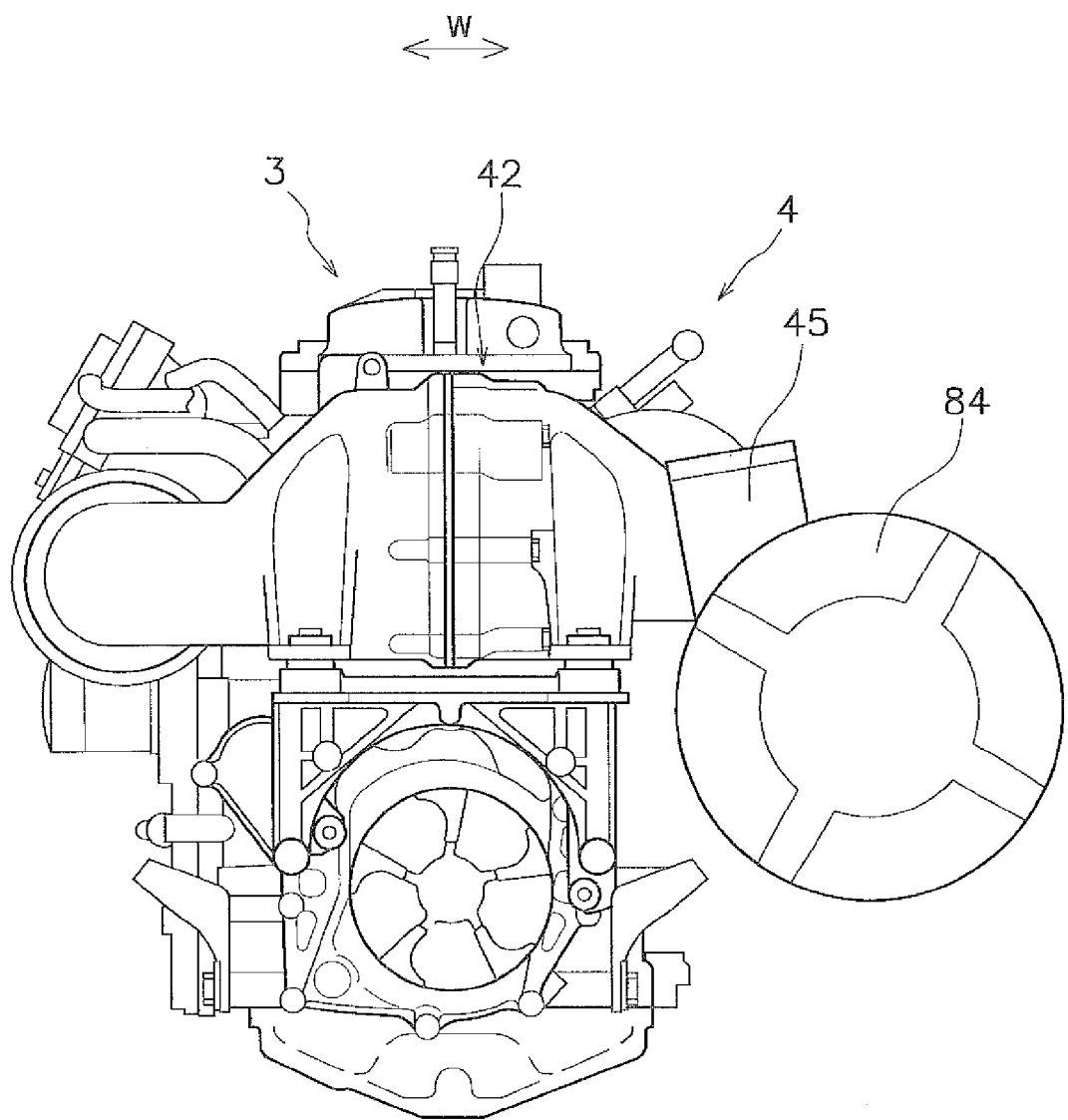
FIG. 16 is a rear view of water lock according to the third preferred embodiment of the present invention.
Figure 17A:
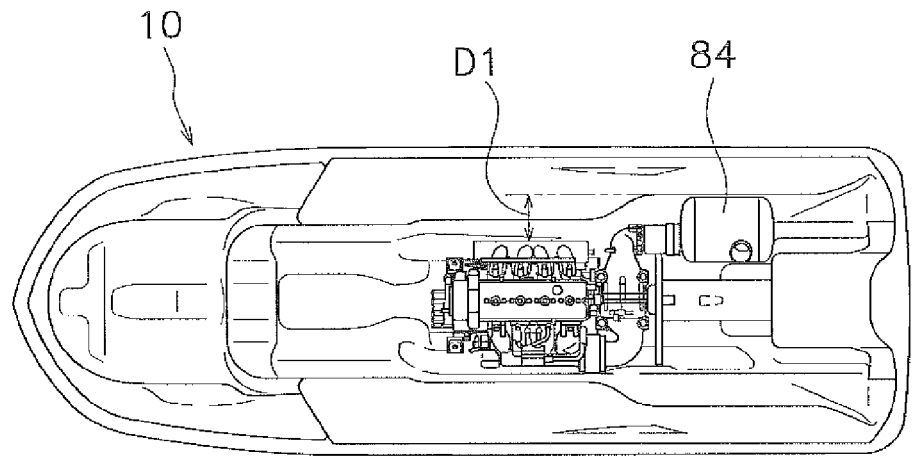
FIGS. 17A and 17B are plan views showing an arrangement of the water lock in the water jet propulsion watercraft according to the third preferred embodiment and an arrangement of the water lock in the water jet propulsion watercraft according to the first preferred embodiment of the present invention.
Figure 17B:
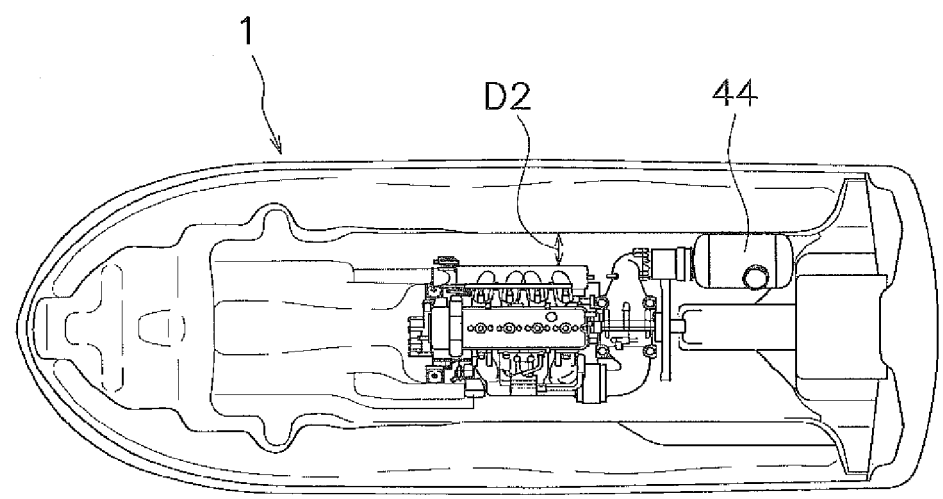

The shape of the water lock is not limited to the shape presented in the previously explained preferred embodiment. For example, it is acceptable to have a cylindrical water lock 84, as shown in FIG. 16. However, when the widthwise dimension L1 of the water lock 44 is smaller than the vertical dimension L2, the water lock 44 can be configured to have a smaller widthwise dimension L1 than a cylindrical water lock 84 of the same volume. FIG. 17A is a plan view of a water jet propulsion watercraft 10 including a cylindrical water lock 84. FIG. 17B is a plan view of a water jet propulsion watercraft 1 including a water lock 44 that is the same as in the previously explained preferred embodiment. As shown in FIGS. 17B and 17A, a distance D2 by which the water lock 44 according to the previously explained preferred embodiment protrudes beyond the engine 3 in a widthwise direction is smaller than a distance D1 by which the cylindrical water lock 84 protrudes beyond the engine 3 in a widthwise direction. Thus, the water lock 44 according to the previously explained preferred embodiment enables a widthwise footprint of the exhaust system to be reduced.

Figure 18:
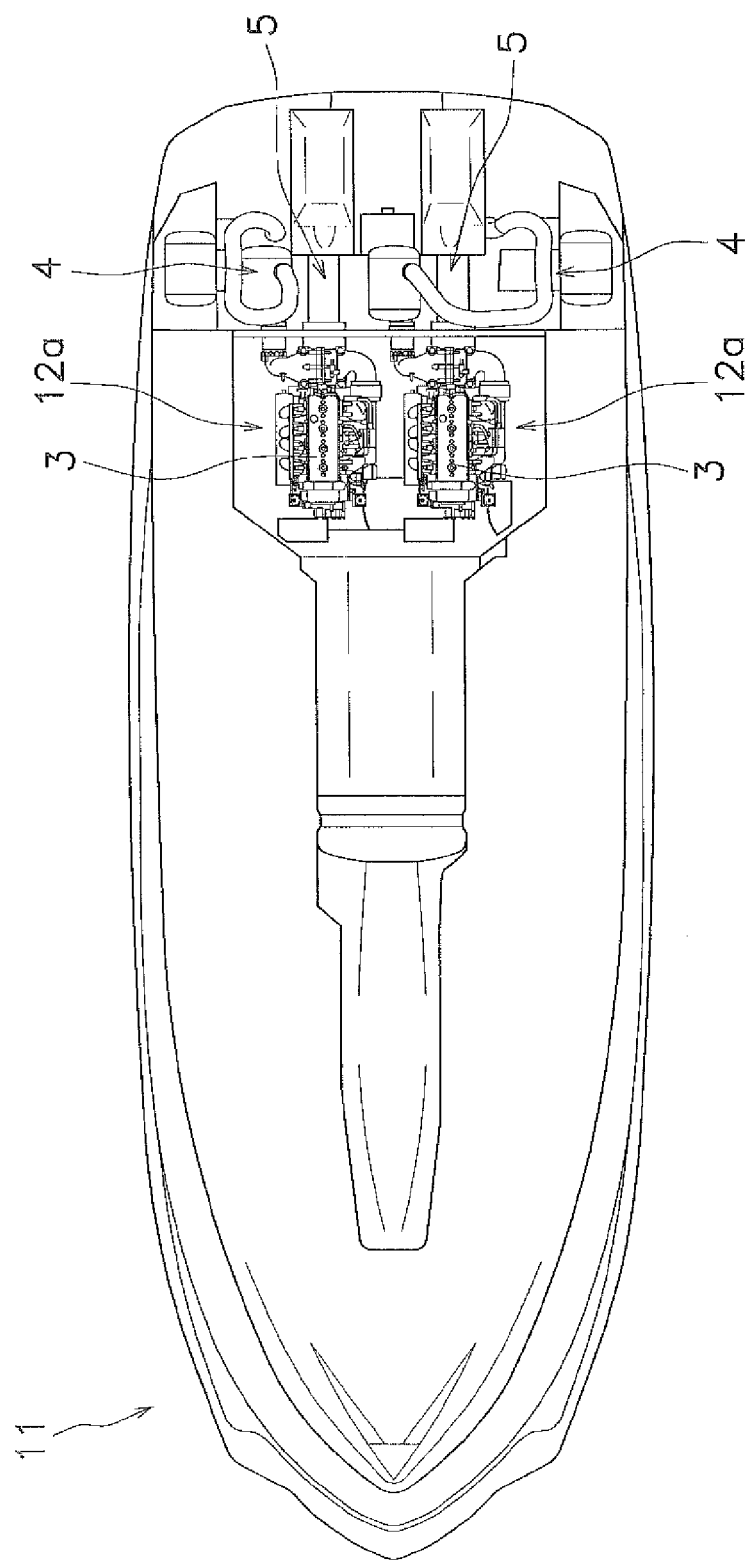
FIG. 18 is a plan view of a hull interior of a water jet propulsion watercraft according to another preferred embodiment of the present invention.

Although the water jet propulsion watercraft 1 in the previously explained preferred embodiments is a personal watercraft, it is acceptable for the water jet propulsion watercraft to be a sport boat. For example, the water jet propulsion watercraft 11 shown in FIG. 18 is a sport boat equipped with a plurality of drive devices 12a and 12b. The drive devices 12a and 12b are each equipped with an engine 3, an exhaust passage 4, and a jet propulsion unit 5 similar to those presented in the previously explained preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A water jet propulsion watercraft comprising:
a hull;
an engine including an exhaust port, the engine housed inside the hull;
a jet propulsion unit arranged to be driven by the engine and configured to draw in water from around the hull and jet the water out;
a first exhaust pipe fixed to the engine and connected to the exhaust port;
a damper section configured to reduce a vibration from the engine;
a catalytic converter unit connected to the first exhaust pipe and attached to the engine through the damper section;
a second exhaust pipe including a first flexible pipe connected to the catalytic converter unit;
a water lock fixed to the hull and connected to the second exhaust pipe a bolt to attach the catalytic converter unit to the engine; and a support member fixed to the engine; wherein the engine supports the catalytic converter unit through the damper section and the support member;

the damper section includes an elastic member in which a through hole is provided;

the catalytic converter unit includes a mounting hole in which the elastic member is installed;

the bolt is arranged to pass through the through hole of the elastic member and is fastened to the support member;

the catalytic converter unit includes a catalyst member and a pipe body housing the catalyst member; and an outer surface of the pipe body includes a recessed section positioned above the mounting hole.

2. The water jet propulsion watercraft according to claim 1, wherein the first exhaust pipe includes a second flexible pipe.

3. The water jet propulsion watercraft according to claim 1, wherein the first exhaust pipe is arranged to extend in a longitudinal direction of the water jet propulsion watercraft along a side of the engine; and the catalytic converter unit opposes a front surface or a rear surface of the engine.

4. The water jet propulsion watercraft according to claim 3, wherein the engine further includes a crankshaft arranged to extend in the longitudinal direction of the water jet propulsion watercraft; and the damper section includes a first damper arranged leftward of an axial centerline of the crankshaft and a second damper arranged rightward of the axial centerline of the crankshaft.

5. The water jet propulsion watercraft according to claim 3, wherein the engine further includes a crankshaft arranged to extend in the longitudinal direction of the water jet propulsion watercraft;

the catalytic converter unit is arranged such that the catalytic converter unit overlaps an axial centerline of the crankshaft in a plan view of the engine.

6. The water jet propulsion watercraft according to claim 1, wherein a direction in which an exhaust gas passes through the catalytic converter unit is a horizontal direction; and a direction in which the catalytic converter unit is supported by the damper section is a vertical direction.

7. The water jet propulsion watercraft according to claim 1, further comprising:

a coupling section configured to couple an output shaft of the engine and an input shaft of the jet propulsion unit together; wherein the support member has a recessed shape at a portion positioned above the coupling section.

8. The water jet propulsion watercraft according to claim 1, wherein an inner surface of the pipe body includes a curved section that is positioned on a back side of the recessed section and curved such that the curved section protrudes in an inward direction of the pipe body.

9. The water jet propulsion watercraft according to claim 1, wherein the catalytic converter unit includes a catalyst member and a pipe body housing the catalyst member;

the catalyst member includes a flange section;

the pipe body includes a first pipe body and a second pipe body that is separate from the first pipe body; and the catalyst member is held in the pipe body by the flange section being pinched between the first pipe body and the second pipe body.

* * * * *